US011710351B2

(12) United States Patent
Luo et al.

(10) Patent No.: US 11,710,351 B2
(45) Date of Patent: Jul. 25, 2023

(54) ACTION RECOGNITION METHOD AND APPARATUS, AND HUMAN-MACHINE INTERACTION METHOD AND APPARATUS

(71) Applicant: Tencent Technology (Shenzhen) Company Limited, Shenzhen (CN)

(72) Inventors: Jingmin Luo, Shenzhen (CN); Liang Qiao, Shenzhen (CN); Xiaolong Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 307 days.

(21) Appl. No.: 17/321,237

(22) Filed: May 14, 2021

(65) Prior Publication Data
US 2021/0271892 A1 Sep. 2, 2021

Related U.S. Application Data

(63) Continuation of application No. PCT/CN2020/084996, filed on Apr. 16, 2020.

(30) Foreign Application Priority Data

Apr. 26, 2019 (CN) .......................... 201910345010.1

(51) Int. Cl.
 G06V 40/20 (2022.01)
 G06T 7/73 (2017.01)
 (Continued)

(52) U.S. Cl.
 CPC ................ G06V 40/23 (2022.01); G06T 7/74 (2017.01); G06V 10/754 (2022.01); G06V 10/82 (2022.01);
 (Continued)

(58) Field of Classification Search
 CPC ...... G06V 40/23; G06V 10/754; G06V 10/82; G06V 20/41; G06V 20/46; G06V 20/48;
 (Continued)

(56) References Cited

U.S. PATENT DOCUMENTS 6,675,174 B1 * 1/2004 Bolle ..................... G06V 20/40
 707/999.102
8,027,542 B2 * 9/2011 Ahammad .............. G06F 16/70
 382/107
(Continued)

FOREIGN PATENT DOCUMENTS

CN 101400001 A * 4/2009
CN 101400001 A 4/2009
(Continued)

OTHER PUBLICATIONS

Content-Based Movie Analysis and Indexing Based on AudioVisual Cues—2004 (Year: 2004).*
(Continued)

*Primary Examiner* — Nizar N Sivji
(74) *Attorney, Agent, or Firm* — Morgan, Lewis & Bockius LLP

(57) ABSTRACT

A computer device extracts a plurality of target windows from a target video. Each of the target windows comprises a respective plurality of consecutive video frames. For each of the target windows, the device performs action recognition on the respective plurality of consecutive video frames corresponding to the target window to obtain respective first action feature information of the target window. The device obtains a similarity between the first action feature information of the target window and preset feature information. The device determines, from the respective obtained similarities corresponding to the plurality of target windows, a highest first similarity and a first target window corresponding to the highest first similarity. The device also determines
(Continued)

a dynamic action corresponding to the highest first similarity as the preset dynamic action in accordance with threshold settings.

15 Claims, 9 Drawing Sheets

(51) Int. Cl.
    *G06V 20/40* (2022.01)
    *G06V 40/10* (2022.01)
    *G06V 10/75* (2022.01)
    *G06V 10/82* (2022.01)
    *G06V 10/422* (2022.01)

(52) U.S. Cl.
    CPC .............. *G06V 20/41* (2022.01); *G06V 20/46* (2022.01); *G06V 20/48* (2022.01); *G06V 40/103* (2022.01); *G06V 10/422* (2022.01)

(58) Field of Classification Search
    CPC .... G06V 40/103; G06V 10/422; G06V 20/40; G06V 40/20; G06T 7/74
    See application file for complete search history.

(56) References Cited

U.S. PATENT DOCUMENTS

2005/0157908 A1* 7/2005 Matsugu ................ G06V 20/00
    382/107
2012/0214594 A1* 8/2012 Kirovski ............... A63F 13/814
    463/36
2018/0261071 A1* 9/2018 Cao ........................ G06V 10/82

FOREIGN PATENT DOCUMENTS

| CN | 107786848 A | * | 3/2018 | |
|---|---|---|---|---|
| CN | 107786848 A | | 3/2018 | |
| CN | 108304757 A | * | 7/2018 | ......... G06K 9/00342 |
| CN | 108304757 A | | 7/2018 | |
| CN | 109035299 A | * | 12/2018 | ............... G06T 7/11 |
| CN | 109035299 A | | 12/2018 | |
| CN | 110059661 A | | 7/2019 | |
| WO | WO-2018086607 A1 | * | 5/2018 | ......... G06K 9/00744 |

OTHER PUBLICATIONS

Content-Based Video Sequence Interpretation—2001 (Year: 2001).*
Human Behavior Detection Method with Direction Change Invariant Features—2013 (Year: 2013).*
Online Gesture Spotting from Visual Hull Data—2011 (Year: 2011).*
A study on human activity recognition from video—2016 (Year: 2016).*
Tencent Technology, ISR, PCT/CN2020/084996, Jul. 1, 2020, 2 pgs.
Tencent Technology, WO, PCT/CN2020/084996, Jul. 1, 2020, 5 pgs.
Tencent Technology, IPRP, PCT/CN2020/084996, Sep. 28, 2021, 6 pgs.

* cited by examiner

| 13 | 14 | 15 | 16 |
| 9 | 10 | 11 | 12 |
| 5 | 6 | 7 | 8 |
| 1 | 2 | 3 | 4 |

ACTION RECOGNITION METHOD AND APPARATUS, AND HUMAN-MACHINE INTERACTION METHOD AND APPARATUS

CROSS-REFERENCE TO RELATED APPLICATIONS

This application is a continuation application of PCT Patent Application No. PCT/CN2020/084996, entitled "ACTION RECOGNITION METHOD AND APPARATUS, AND HUMAN-MACHINE INTERACTION METHOD AND APPARATUS" filed on Apr. 16, 2020, which claims priority to Chinese Patent Application No. 201910345010.1, entitled "ACTION RECOGNITION METHOD AND APPARATUS, HUMAN-MACHINE INTERACTION METHOD AND APPARATUS, AND STORAGE MEDIUM" filed with the National Intellectual Property Administration, PRC on Apr. 26, 2019, both of which are incorporated herein by reference in their entirety.

FIELD OF THE TECHNOLOGY

This application relates to the field of computer technologies, and in particular, to an action recognition method and apparatus, and a human-machine interaction method and apparatus.

BACKGROUND OF THE DISCLOSURE

An action recognition technology is a technology used for performing analysis processing on an action image, so as to understand an action included in the action image. With the development of computer technologies, the action recognition technology has been widely applied to a plurality of fields such as video surveillance, motion sensing games, virtual reality, and Internet medical care, and has become a hot research direction.

In a conventional solution, a manner of recognizing an action performed by a user is generally as follows: The user performs an action within a photographing range of an electronic device; the electronic device photographs the user, to obtain a corresponding action image, and then recognizes, based on the action image, whether the user performs a preset action. However, the manner of action recognition in the conventional solution is mainly to simply recognize an action image. When acquisition quality of the action image is insufficiently good, a recognition error is prone to occur, causing low action recognition accuracy.

SUMMARY

Embodiments of this application provide an action recognition method and apparatus, a human-machine interaction method and apparatus, an electronic device, and a computer-readable storage medium.

An action recognition method is provided, performed by an electronic device (e.g., a computer device), the method comprising:
  extracting a plurality of target windows from a target video, each of the plurality of target windows including a respective plurality of consecutive video frames;
  for each of the plurality of target windows:
    performing action recognition on the respective plurality of consecutive video frames corresponding to the target window, to obtain respective first action feature information of the target window, the first action feature information comprising movement of one or more body parts of a subject and is used for describing a dynamic action included in the target window; and
    obtaining a similarity between the first action feature information of the target window and preset feature information, the preset feature information being used for describing a preset dynamic action;
  determining, from the respective obtained similarities corresponding to the plurality of target windows, a highest first similarity and a first target window corresponding to the highest first similarity; and
  determining a dynamic action corresponding to the highest first similarity as the preset dynamic action when (i) the highest first similarity is greater than a first preset threshold and (ii) a difference between the highest first similarity and a second similarity is greater than a second preset threshold, the second similarity being a similarity between respective first action feature information of a target window adjacent to the first target window and the preset feature information.

In some embodiments, extracting the plurality of target windows from a target video includes:
  classifying the plurality of video frames with the first preset quantity as a quantity of video frames in each target window and a second preset quantity as a quantity of same video frames included in any two adjacent target windows, to obtain the plurality of target windows.

In some embodiments, the performing action recognition on the video frames in the each target window, to obtain first action feature information of the each target window includes:
  extracting, for each video frame in the target window, a plurality of body key points in the video frame;
  performing action recognition on the video frame according to a distribution of the plurality of body key points, to obtain second action feature information of the video frame, the second action feature information being used for describing a static action included in the video frame; and
  combining second action feature information of the video frames in the target window, to obtain the first action feature information of the each target window.

In some embodiments, the preset dynamic action is performed by at least two preset body parts; and the performing action recognition on the each video frame according to a distribution of the plurality of body key points, to obtain second action feature information of the video frame includes at least one of the following:
  determining an angle between any two preset body parts in the video frame according to coordinates of the plurality of body key points in the video frame and body parts to which the plurality of body key points belong, and using the angle as the second action feature information;
  obtaining a displacement amount between at least one of the plurality of body key points and a body key point corresponding to a reference video frame, and using the displacement amount as the second action feature information, the reference video frame being previous to the video frame by a third preset quantity of video frames; and
  obtaining a size of a reference body part in any two preset body parts and a distance between the any two preset body parts, and using a ratio of the distance to the size of the reference body part as the second action feature information.

In some embodiments, the first action feature information is a first action matrix including M first action vectors, the preset feature information is a preset action matrix including N preset action vectors, M and N being positive integers, and the obtaining a similarity between the first action feature information of the target window and preset feature information includes:

creating a similarity matrix, the similarity matrix having M rows and N columns, or N rows and M columns;

obtaining, for a specified position corresponding to an $i^{th}$ first action vector and a $j^{th}$ preset action vector in the similarity matrix, a sum of a maximum similarity among similarities of a first position, a second position, and a third position and a similarity between the $i^{th}$ first action vector and the $j^{th}$ preset action vector as a similarity of the specified position, the first position being a position corresponding to an $(i-1)^{th}$ first action vector and the $j^{th}$ preset action vector, the second position being a position corresponding to the $(i-1)^{th}$ first action vector and a $(j-1)^{th}$ preset action vector, and the third position being a position corresponding to the $i^{th}$ first action vector and the $(j-1)^{th}$ preset action vector, i being a positive integer not less than 1 and not greater than M, and j being a positive integer not less than 1 and not greater than N; and determining a similarity of a position corresponding to an $M^{th}$ first action vector and an $N^{th}$ preset action vector in the similarity matrix as the similarity between the first action feature information and the preset feature information.

In accordance with some embodiments of the present disclosure, a human-machine interaction method is provided, performed by an electronic device (e.g., a computer device), the method including:

photographing an action video of a user by using a configured camera, as a target video;

extracting a plurality of target windows from the target video, each of the plurality of target windows including a first preset quantity of consecutive video frames;

performing action recognition on the video frames in the target window, to obtain first action feature information of the target window, the first action feature information being used for describing a dynamic action included in the target window;

obtaining a similarity between the first action feature information of the target window and preset feature information, the preset feature information being used for describing a preset dynamic action, and a maximum similarity in a plurality of obtained similarities being a first similarity;

determining a dynamic action included in a first target window corresponding to the first similarity as the preset dynamic action when the first similarity is greater than a first preset threshold and a difference between the first similarity and a second similarity is greater than a second preset threshold, the second similarity being a similarity corresponding to first action feature information of a target window adjacent to the first target window; and performing an interactive operation corresponding to the preset dynamic action.

In some embodiments, the performing an interactive operation corresponding to the preset dynamic action includes at least one of the following:

determining that verification on an action of the user is successful, and displaying a preset dynamic effect indicating that the verification is successful;

allocating virtual reward data corresponding to the preset dynamic action to the user; and allocating an operation permission corresponding to the preset dynamic action to the user.

In accordance with some embodiments of the present disclosure, an action recognition apparatus is provided, including:

an extraction module, configured to extract a plurality of target windows from a target video, each of the plurality of target windows including a first preset quantity of consecutive video frames;

an action recognition module, configured to perform action recognition on the video frames in the target window, to obtain first action feature information of the target window, the first action feature information being used for describing a dynamic action included in the target window;

a similarity obtaining module, configured to obtain a similarity between the first action feature information of the target window and preset feature information, the preset feature information being used for describing a preset dynamic action, and a maximum similarity in a plurality of obtained similarities being a first similarity; and a determining module, configured to determine a dynamic action included in a first target window corresponding to the first similarity as the preset dynamic action when the first similarity is greater than a first preset threshold and a difference between the first similarity and a second similarity is greater than a second preset threshold, the second similarity being a similarity corresponding to first action feature information of a target window adjacent to the first target window.

In some embodiments, the extraction module includes:

an obtaining unit, configured to extract a plurality of video frames from the target video; and a classification unit, configured to classify the plurality of video frames with the first preset quantity as a quantity of video frames in each target window and a second preset quantity as a quantity of same video frames included in any two adjacent target windows, to obtain the plurality of target windows.

In some embodiments, the action recognition module includes:

an extraction unit, configured to extract, for each video frame in the target window, a plurality of body key points in the video frame;

an action recognition unit, configured to perform action recognition on the video frame according to a distribution of the plurality of body key points, to obtain second action feature information of the video frame, the second action feature information being used for describing a static action included in the video frame; and a combination unit, configured to combine second action feature information of the video frames in the target window, to obtain the first action feature information of the target window.

In some embodiments, the preset dynamic action is performed by at least two preset body parts; and the action recognition unit is further configured to perform at least one of the following operations:

determining an angle between any two preset body parts in the video frame according to coordinates of the plurality of body key points in the video frame and body parts to which the plurality of body key points belong, and using the angle as the second action feature information;

obtaining a displacement amount between at least one of the plurality of body key points and a body key point corresponding to a reference video frame, and using the displacement amount as the second action feature information, the reference video frame being previous to the video frame by a third preset quantity of video frames; and obtaining a size of a reference body part in any two preset body parts and a distance between the any two preset body parts, and using a ratio of the distance to the size of the reference body part as the second action feature information.

In some embodiments, the first action feature information is a first action matrix including M first action vectors, and the preset feature information is a preset action matrix including N preset action vectors, M and N being positive integers; and the similarity obtaining module includes:

a creation unit, configured to create a similarity matrix, the similarity matrix having M rows and N columns, or N rows and M columns;

a similarity obtaining unit, configured to obtain, for a specified position corresponding to an $i^{th}$ first action vector and a $j^{th}$ preset action vector in the similarity matrix, a sum of a maximum similarity among similarities of a first position, a second position, and a third position and a similarity between the $i^{th}$ first action vector and the $j^{th}$ preset action vector as a similarity of the specified position, the first position being a position corresponding to an $(i-1)^{th}$ first action vector and the $j^{th}$ preset action vector, the second position being a position corresponding to the $(i-1)^{th}$ first action vector and a $(j-1)^{th}$ preset action vector, and the third position being a position corresponding to the $i^{th}$ first action vector and the $(j-1)^{th}$ preset action vector, i being a positive integer not less than 1 and not greater than M, and j being a positive integer not less than 1 and not greater than N; and the similarity obtaining unit being further configured to determine a similarity of a position corresponding to an $M^{th}$ first action vector and an $N^{th}$ preset action vector in the similarity matrix as the similarity between the first action feature information and the preset feature information.

In accordance with some embodiments of the present disclosure, a human-machine interaction apparatus is provided, including:

a photographing module, configured to photograph an action video of a user by using a configured camera, as a target video;

an extraction module, configured to extract a plurality of target windows from the target video, each of the plurality of target windows including a first preset quantity of consecutive video frames;

an action recognition module, configured to perform action recognition on the video frames in the target window, to obtain first action feature information of the target window, the first action feature information being used for describing a dynamic action included in the target window;

a similarity obtaining module, configured to obtain a similarity between the first action feature information of the target window and preset feature information, the preset feature information being used for describing a preset dynamic action, and a maximum similarity in a plurality of obtained similarities being a first similarity;

a determining module, configured to determine a dynamic action included in a first target window corresponding to the first similarity as the preset dynamic action when the first similarity is greater than a first preset threshold and a difference between the first similarity and a second similarity is greater than a second preset threshold, the second similarity being a similarity corresponding to first action feature information of a target window adjacent to the first target window; and an execution module, configured to perform an interactive operation corresponding to the preset dynamic action.

In some embodiments, the execution module is configured to perform at least one of the following operations:

determining that verification on an action of the user is successful, and displaying a preset dynamic effect indicating that the verification is successful;

allocating virtual reward data corresponding to the preset dynamic action to the user; and allocating an operation permission corresponding to the preset dynamic action to the user.

In some embodiments, an electronic device is provided. The electronic device includes one or more processors and memory, the memory storing computer-readable instructions, the computer-readable instructions, when executed by the processors, cause the processors to perform the operations in the foregoing action recognition method. In some embodiments, the electronic device is also referred to as a computer device or a computing device.

In some embodiments, an electronic device is provided. The electronic device includes one or more processors and memory, the memory storing computer-readable instructions, the computer-readable instructions, when executed by the processors, cause the processor to perform the operations in the foregoing human-machine interaction method. In some embodiments, the electronic device is also referred to as a computer device or a computing device.

A non-transitory (e.g., non-volatile) computer-readable storage medium is provided, storing computer-readable instructions, the computer-readable instructions, when executed by one or more processors, causing the one or more processors to perform the operations in the foregoing action recognition method.

A non-transitory (e.g., non-volatile) computer-readable storage medium is provided, storing computer-readable instructions, the computer-readable instructions, when executed by one or more processors, causing the one or more processors to perform the operations in the foregoing human-machine interaction method.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes implementations of this application in detail with reference to the accompanying drawings.

Before embodiments of this application are explained and described in detail, concepts related to the embodiments of this application are first explained as follows:

1. Static action: an action performed when a body part is in a static state. This action does not have a motion process. When the body part performs the static action, neither a position nor a posture is changed. For example, static actions may include a head raising action, a handstand action, and an arm bending action.

2. Dynamic action: an action performed when a body part is in a motion state. This action has a motion process. When the body part performs the dynamic action, a position or a posture may be changed. One dynamic action may be considered as a combination of a plurality of static actions.

For example, dynamic actions may include a wave action, a swing action, and a chest expansion action.

Figure 1:
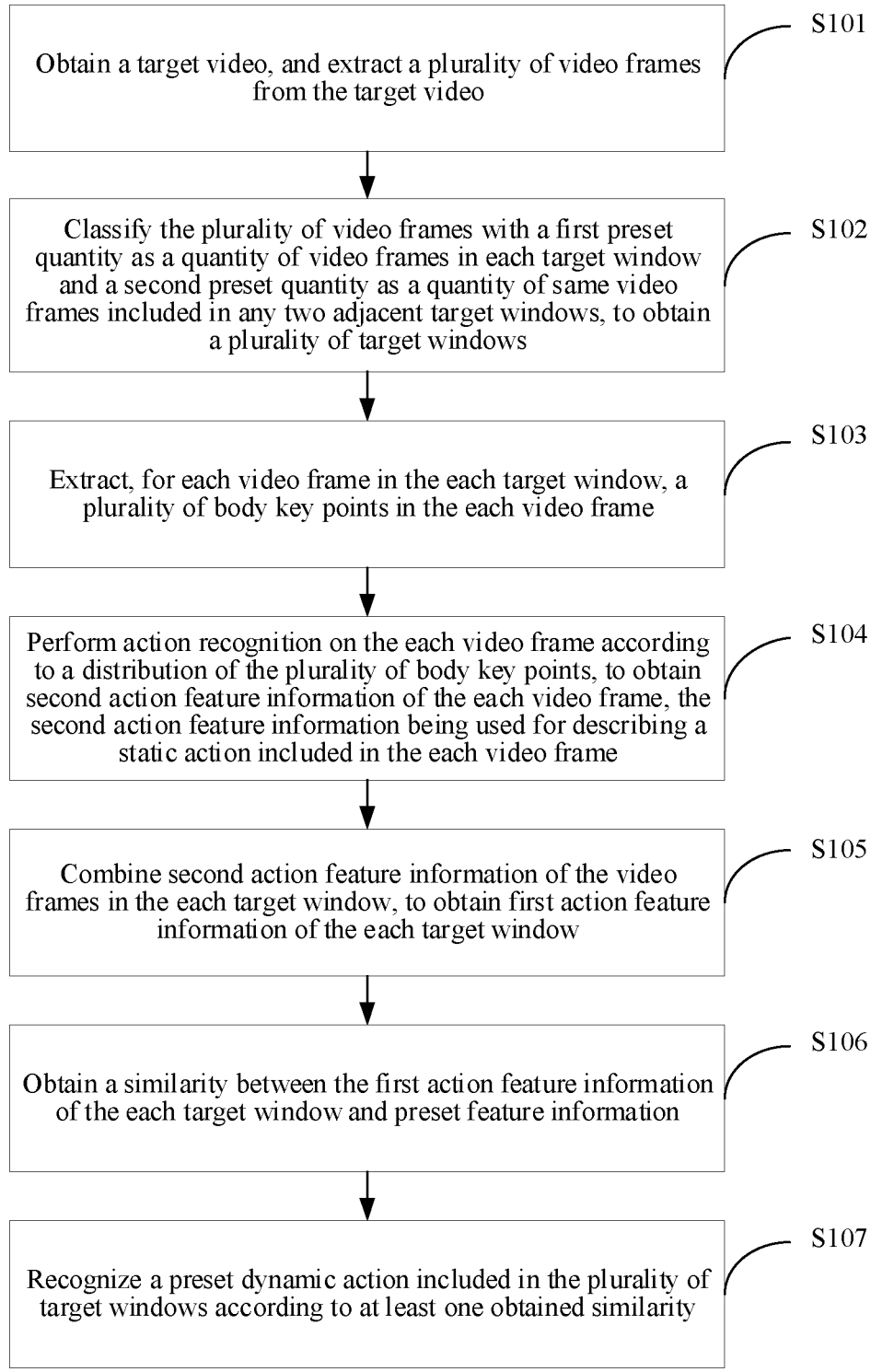
FIG. 1 is a flowchart of an action recognition method according to some embodiments of this application.

FIG. 1 is a flowchart of an action recognition method according to some embodiments of this application. Referring to FIG. 1, the method is applicable to an electronic device. The electronic device may be a mobile phone, a tablet computer, a computer, a motion sensing game console, or an access control device. The method includes the following steps:

S101: Obtain a target video, and extract a plurality of video frames from the target video.

In this embodiment of this application, an example in which a preset dynamic action is recognized is used. The electronic device determines the preset dynamic action, and performs action recognition on a target video when obtaining the target video, to recognize the preset dynamic action included in the target video.

The target video may be any video obtained by the electronic device. In terms of content, the target video may be a dance video, an entertainment news video, or a sports video. In terms of a source, the target video may be a video captured by the electronic device by using a camera, a video downloaded from the Internet, or a video sent by another device.

The term "a plurality of" mentioned in the embodiments of this application specifically means "more than one".

In some embodiments, the electronic device receives an action recognition instruction, calls a video database according to the action recognition instruction, and obtains a video selected from the video database by a user as the target video, to perform action recognition on the target video. The video database stores one or more videos.

For example, a video surveillance client is installed on the electronic device, and the video surveillance client is configured to record a video and store the recorded video in the video database. When the user needs to check whether some videos include the preset dynamic action, an action recognition instruction may be triggered, and videos to be checked are selected from the video database, to trigger an action recognition process.

In some embodiments, the electronic device receives an action recognition instruction delivered by a server. The action recognition instruction carries a preset dynamic action, and is used for instructing the electronic device to recognize a video including the preset dynamic action. Then the electronic device respectively uses each locally stored video as a target video according to the action recognition instruction, to trigger an action recognition process.

The server is configured to perform video security detection, and may regularly or randomly deliver, according to relevant regulations, an action recognition instruction carrying some dynamic actions of violation to the electronic device.

In some embodiments, the electronic device receives an action recognition instruction, activates a camera, photographs a video by using the camera, and uses the currently photographed video as a target video. For example, the electronic device is a motion sensing game console. When detecting a game start operation, the motion sensing game console determines that an action recognition instruction is received, so that the motion sensing game console photographs a video of the user according to the action recognition instruction, uses the photographed video as the target video, to trigger an action recognition process, and recognizes whether the user performs a preset dynamic action, thereby performing a subsequent operation according to a recognition result.

If the target video is a video photographed in real time, when the video is being photographed, the electronic device performs action recognition on a video clip having been photographed. When a new video clip is photographed, the electronic device performs action recognition on the newly photographed video clip. When the target video is a locally stored video, the electronic device may perform action recognition on the target video with the target video as a whole.

In some embodiments, the target video includes a plurality of video frames sequentially arranged in chronological order, and each video frame may include one or more static actions; and the preset dynamic action includes a plurality of static actions. Therefore, to recognize the preset dynamic action included in the target video, a plurality of video frames are extracted from the target video, and subsequently processing is performed according to the plurality of video frames.

The plurality of video frames may include all video frames in the target video, or include only some consecutive video frames in the target video. When extracting the video frames from the target video, the electronic device may sequentially extract the video frames according to an arrangement order of the video frames in the target video, or extract a preset quantity of consecutive video frames from the target video. For example, any video frame in the target video is used as a first extracted video frame, a preset quantity of consecutive video frames are extracted according to an arrangement order of video frames after the video frame. The preset quantity may be determined according to a complexity requirement of the action recognition or a quantity of video frames in the target video.

In some embodiments, if the target video is a video photographed in real time, the electronic device extracts a preset quantity of video frames as a video clip each time the preset quantity of video frames are photographed, and performs action recognition on the video clip. After a preset quantity of video frames are photographed again, the electronic device continues to extract the preset quantity of video frames, to obtain another video clip, and performs action recognition on the another video clip. In other words, each time a preset quantity of video frames photographed before the current time point are used as an input, to perform action recognition. When the target video is a locally stored video, the electronic device extracts a plurality of video frames from the target video.

S102: Classify the plurality of video frames with a first preset quantity as a quantity of video frames in each target window and a second preset quantity as a quantity of same video frames included in any two adjacent target windows, to obtain a plurality of target windows.

Each target window includes the first preset quantity of consecutive video frames. The plurality of target windows form a window sequence. Subsequently, the electronic device may perform action recognition on each target window in the window sequence by using a target window as a unit, to recognize a preset dynamic action included in each target window.

The quantity of the video frames included in each target window is the first preset quantity, and the quantity of the same video frames included in any two adjacent target windows is the second preset quantity. The first preset quantity is an integer greater than 1, and the second preset quantity is an integer greater than 0. In addition, when the first preset quantity is not greater than the second preset quantity, that adjacent target windows include the second preset quantity of same video frames cannot be implemented, so that the first preset quantity is greater than the second preset quantity.

For example, the first preset quantity is 30, and the second preset quantity is 29. Then, each target window includes 30 video frames, and any two adjacent target windows include 29 same video frames.

In some embodiments, the electronic device sets a preset step, the preset step being used for specifying a distance between start video frames of any two adjacent target windows, and the preset step being a difference between the first preset quantity and the second preset quantity. Then, the electronic device uses a start video frame in the plurality of extracted video frames as a first start video frame, and starts to extract the first preset quantity of video frames from the first start video frame, to obtain a first target window. The electronic device continues to determine a second start video frame with a distance of the preset step to the first start video frame, and extracts the first preset quantity of video frames from the second start video frame, to obtain a next target window. By analogy, target windows spaced at intervals of the preset step can be sequentially extracted.

For example, when the first preset quantity is 30 and the preset step is 2, by using a first video frame in the target video as a start point, the first frame to the $30^{th}$ frame are used as a first target window, and the third frame to the $32^{th}$ frame are used as a second target window. By analogy, a plurality of target windows can be extracted from the target video.

In this embodiment of this application, a process of obtaining the target windows is described by merely using an example in which the electronic device extracts a plurality of video frames and classifies the plurality of video frames according to the first preset quantity and the second preset quantity. In this embodiment of this application, another possible implementation may alternatively be used, as long as window classification processing is performed on the target video in the time dimension, a plurality of target windows are extracted from the target video, and each of the target windows includes the first preset quantity of consecutive video frames.

For example, by using the first preset quantity as a quantity of video frames in each of the target windows, the electronic device uses a start video frame in the plurality of extracted video frames as a first start video frame, and starts to extract the first preset quantity of video frames from the first start video frame, to obtain a target window. In this case, the electronic device randomly determines a step, and continues to determine a second start video frame with a distance of the step to the first start video frame; extracts the first preset quantity of video frames starting from the second start video frame, to obtain a next target window; and continues to randomly determine another step. By analogy, a plurality of target windows can be sequentially extracted, and a quantity of same video frames included in any two adjacent target windows is not fixed.

S103: Extract, for each video frame in the target window, a plurality of body key points in the video frame.

A dynamic action in the target window is related to a static action in each video frame. Therefore, to perform dynamic action recognition on the target window, feature extraction may be first performed on each video frame, to obtain action feature information of the video frame, and then action feature information of the target window is obtained according to the action feature information of the video frame.

Therefore, for the video frame in the target window, the electronic device performs key point extraction on the video frame, to extract a plurality of body key points in the video frame, the plurality of body key points being used for describing an object included in the each video frame. The object included in the video frame may be a body of a human, a body of an animal, or a body of another subject. The body key points in the video frame may be an eye key point, an ear key point, a nose key point, a shoulder key point, a hand key point, a foot key point, and the like.

In some embodiments, the electronic device inputs the video frame into a key point detection model, and performs key point detection on the video frame based on the key point detection model, so that a plurality of body key points in the video frame can be obtained.

Figure 2:
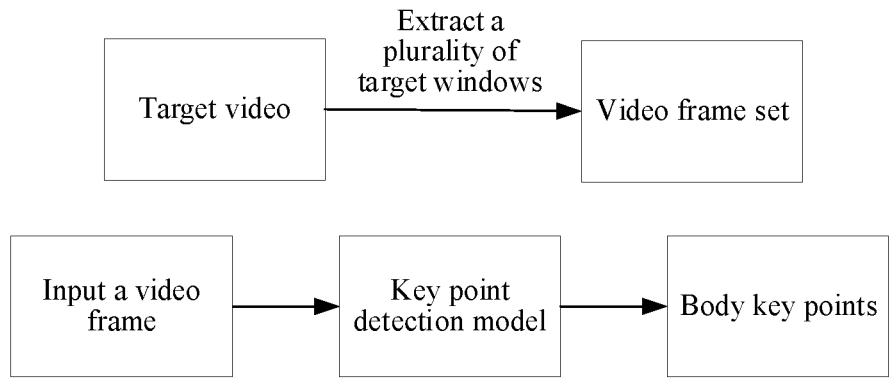
FIG. 2 is a flowchart of detecting body key points according to some embodiments of this application.

As shown in FIG. 2, after obtaining the target video, the electronic device extracts a plurality of target windows from the target video, obtains a video frame set in each of the target windows, and inputs each video frame in the video frame set into the key point detection model, so that body key points in the video frame can be outputted based on the key point detection model.

Optionally, the electronic device inputs a video frame into the key point detection model, and the key point detection model generates heatmaps corresponding to a plurality of body parts according to the video frame, that is, one heatmap corresponds to one body part. A pixel value of each pixel point in each heatmap represents a probability that a pixel point in the video frame that corresponds to the pixel point is a key point in a corresponding body part. A greater pixel value of the pixel point in the heatmap represents that the corresponding pixel point in the video frame is more likely to be a body key point on the body part, and a smaller pixel value of the pixel point in the heatmap represents that the corresponding pixel point in the video frame is more likely not to be a body key point on the body part. A pixel point having a greatest pixel value in a heatmap is obtained, and a pixel point in the video frame that corresponds to the pixel point is determined as a body key point of a body part corresponding to the heatmap.

During obtaining of a pixel point having a greatest pixel value in a heatmap, a non-maximum suppression (NMS) algorithm may be used for performing local maximum search, and suppress pixel values that are not maximum values, to obtain the pixel point having the greatest pixel value in the heatmap. Alternatively, another manner may be used.

In addition, the video frame is inputted into a key point detection model. After the key point detection model determines body key points in the video frame by using heatmaps, a vector formed by any two body key points in the video frame can be obtained. Whether the vector formed by the any two body key points is the same as a preset vector is determined. If it is determined that the vector formed by the any two body key points is the same as the preset vector, it is determined that the any two body key points belong to a body part corresponding to the preset vector that is on the same object.

Figure 3:
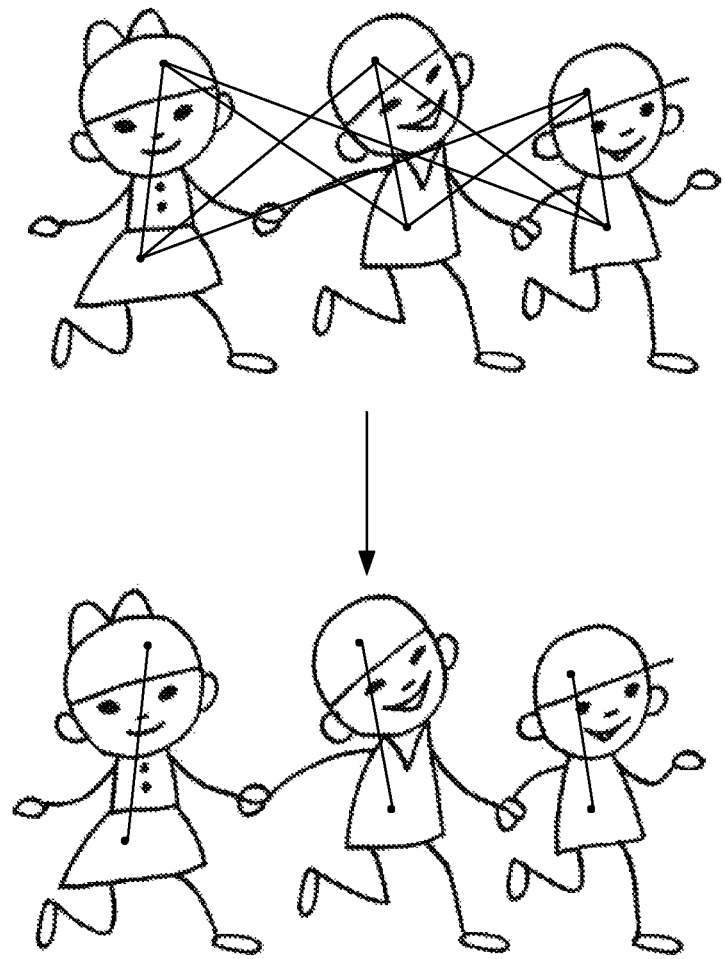
FIG. 3 is a schematic diagram of body key points of a video frame according to some embodiments of this application.

As shown in FIG. 3, the video frame includes three objects, and six body key points are detected. Any two of the six body key points are connected to form a plurality of vectors, and whether each of the plurality of vectors is the same as a preset vector is determined, so that objects to which the six body key points belong can be determined.

A model structure of the key point detection model may be darknet (a model structure), including a feature extraction submodel and a feature processing submodel. The feature extraction submodel includes a plurality of network layers. Sizes of convolution kernels used in each network layer may be the same or different, and an output of each network layer is used as an input of a next network layer. Outputs, inputs, and convolution kernel sizes of the plurality of network layers of the feature extraction submodel may be shown in Table 1. The feature processing submodel includes two branches, the first branch being used for obtaining heatmaps, and the second branch being used for determining body parts to which body key points belong. In addition, each branch includes a plurality of network layers. Sizes of convolution kernels used in each network layer may be the same or different, and an output of each network layer is used as an input of a next network layer. Outputs, inputs, and convolution kernel sizes of a plurality of network layers of the first branch may be shown in Table 2, and outputs, inputs, and convolution kernel sizes of a plurality of network layers of the second branch may be shown in Table 3.

TABLE 1

| Output | Input | Convolution kernel size |
|---|---|---|
| Input layer | | |
| 16 | 3 | 3 |
| Max pooling (pooling layer) | | |
| 32 | 16 | 3 |
| Max pooling (pooling layer) | | |
| 16 | 32 | 1 |
| 128 | 16 | 3 |
| 16 | 128 | 1 |
| 128 | 16 | 3 |
| Max pooling (pooling layer) | | |
| 32 | 128 | 1 |
| 256 | 32 | 3 |
| 32 | 256 | 1 |
| 256 | 32 | 3 |
| Max pooling (pooling layer) | | |
| 64 | 256 | 1 |
| 512 | 64 | 3 |
| 64 | 512 | 1 |
| 512 | 64 | 3 |
| 256 | 512 | 3 |
| 128 | 256 | 3 |

TABLE 2

| Output | Input | Convolution kernel size |
|---|---|---|
| 256 | 256 | 3 |
| 256 | 256 | 3 |
| 256 | 256 | 3 |
| 512 | 256 | 1 |
| 38 | 512 | 1 |

TABLE 3

| Output | Input | Convolution kernel size |
|---|---|---|
| 256 | 256 | 3 |
| 256 | 256 | 3 |
| 256 | 256 | 3 |
| 512 | 256 | 1 |
| 19 | 512 | 1 |

During training of the key point detection model, the electronic device constructs an initialized key point detection model, obtains a plurality of sample video frame and body key points in each sample video frame, and trains the key point detection model according to the sample video frame and the body key points in the sample video frame, so that the key point detection model has a capability of detecting body key points, thereby obtaining a trained key point detection model.

In some embodiments, during training of the key point detection model, the electronic device may use a Common Objects in Context (COCO) dataset to train the key point detection model. The key point detection model may be a convolutional neural network model, a fully convolutional neural network model, a MobileNet model (a neural network model applicable to a mobile terminal), a ShuffleNet model (a neural network model applicable to a mobile terminal), or the like; and may alternatively be a model based on a combination of a heatmap and Part Affinity Fields (PAFs), or the like.

S104: Perform action recognition on the video frame according to a distribution of the plurality of body key points, to obtain second action feature information of the video frame, the second action feature information being used for describing a static action included in the video frame.

When extracting the plurality of body key points in the video frame, the electronic device can determine coordinates of each body key point, to determine a position of the body key point in the video frame, and then determine the distribution of the plurality of body key points. The electronic device obtains, according to the distribution of the plurality of body key points, second action feature information used for describing a static action included in the video frame.

Manners of obtaining the second action feature information according to the plurality of body key points may include at least one of steps S1041 to S1043:

S1041: Determine an angle between any two preset body parts in the video frame according to coordinates of the plurality of body key points in the video frame and body parts to which the plurality of body key points belong, and use the angle as the second action feature information.

The preset dynamic action is performed by at least two preset body parts. Therefore, the electronic device may obtain body key points of each of any two preset body parts according to the coordinates of the plurality of body key points in the video frame, determine a vector of each preset body part according to coordinates of body key points of each of the any two preset body parts, determine an angle between the any two preset body parts according to determined vectors of the any two preset body parts, and use the angle as the second action feature information.

For example, the electronic device obtains an angle of an elbow joint of a body relative to a shoulder and an angle of a wrist joint relative to the elbow joint, and uses the obtained angles as the second action feature information.

A posture of an object may be represented according to a skeleton formed by a plurality of body key points. Therefore, in this embodiment of this application, an angle between any two preset body parts is used as the second action feature information, and the second action feature information can represent a posture of a skeleton formed by the plurality of body key points, that is, a static action of the object.

In some embodiments, after the angle between any two preset body parts is obtained, to ensure that a similarity between a preset dynamic action and a dynamic action in the target window can be calculated subsequently according to the obtained angle, the electronic device may first encode the obtained angle, so that the angle can be normalized, and the second action feature information is represented by using the normalized angle.

A manner of the encoding may be one-hot encoding, that is, dividing an angle of 360 degrees into a plurality of parts, for example, four parts, including 0 to 90 degrees, 91 degrees to 180 degrees, 181 degrees to 270 degrees, and 271 degrees to 360 degrees, each part being corresponding to one code. When the obtained angle falls within any range, code corresponding to the range within which the angle falls is set to 1, and code corresponding to the other ranges are set to 0, to obtain a code corresponding to the angle.

When three or more preset body parts perform the preset dynamic action, the electronic device uses any two preset body parts as a group. For each group of preset body parts, a corresponding angle can be obtained. Then, angles corresponding to a plurality of groups of preset body parts are all used as the second action feature information.

S1042: Obtain a displacement amount between at least one of the plurality of body key points and a body key point corresponding to a reference video frame, and use the displacement amount as the second action feature information.

The reference video frame is previous to the video frame by a third preset quantity of video frames. The target window includes one dynamic action, and a displacement may occur between body key points in the current video frame and corresponding body key points in the reference video frame. Therefore, the electronic device may determine a displacement amount between the body key points in the current video frame and the corresponding body key points in the reference video frame, where the displacement amount may represent a motion amplitude of the body key points in the current video frame relative to the corresponding body key points in the reference video frame; and the electronic device uses the displacement amount as the second action feature information.

In some embodiments, after the plurality of body key points are obtained, the electronic device obtains coordinates of any one of the body key points and coordinates of a corresponding body key point in the reference video frame, the coordinates including a horizontal coordinate and a vertical coordinate; determines a difference between horizontal coordinates of the key point in the video frame and the corresponding key point in the reference video frame and a difference between vertical coordinates thereof; and uses both the difference between the horizontal coordinates and the difference between the vertical coordinates as the second action feature information.

For example, after the plurality of body key points are obtained, the electronic device obtains a difference between horizontal coordinates of a left wrist key point in the video frame and a left wrist key point in the reference video frame and a difference between vertical coordinates thereof, the reference video frame being previous to the video frame by five frames.

In some embodiments, after the plurality of body key points are obtained, the electronic device obtains coordinates of any one of the plurality of body key points and coordinates of a corresponding body key point in the reference video frame, obtains coordinates of a corresponding position in the current video frame of the corresponding body key point in the reference video frame, determines a distance between the coordinates of the corresponding position in the current video frame of the corresponding body key point in the reference video frame and the coordinates of the body key point in the current video frame, and uses the distance as the second action feature information.

S1043: Obtain a size of a reference body part in any two preset body parts and a distance between the any two preset body parts, and use a ratio of the distance to the size of the reference body part as the second action feature information.

Because the preset dynamic action is performed by at least two preset body parts, the electronic device may obtain a distance between any two preset body parts in the video frame according to coordinates of the plurality of body key points in the video frame; and for the two preset body parts, the electronic device may further use one body part as a reference body part, obtain a size of the reference body part, determine a ratio of the distance between the two preset body parts to a size of the reference body part, and use the ratio as the second action feature information.

The reference body part may be a part in the body with a fixed size. For example, the reference body part may be a shoulder or a neck. Therefore, a size of the reference body part may be a size of the shoulder, a size of the neck, or the like.

For example, the preset dynamic action is a wave action performed by a shoulder and an arm. Then, the shoulder is used as a reference body part, and a distance between a left wrist and the shoulder can be determined according to a left wrist key point and a left shoulder key point; a shoulder width can be determined according to the left shoulder key point and a right shoulder key point; and a ratio can be determined according to the distance between the left wrist and the shoulder and the shoulder width, and the ratio is used as the second action feature information.

A ratio of a distance between any two preset body parts to a size of a reference body part is used as the second action feature information, rather than that merely a distance between any two preset body parts is calculated. Therefore, differences in sizes of different objects are considered, so that obtained action feature information can be compatible with objects with different sizes, thereby avoiding an impact from sizes.

When three or more preset body parts perform the preset dynamic action, the electronic device uses any two preset body parts as a group. For each group of preset body parts, a corresponding angle can be obtained. Then, angles corresponding to a plurality of groups of preset body parts are all used as the second action feature information.

In this embodiment of this application, the second action feature information may be separately obtained through any one of steps S1041 to S1043, so that the second action feature information can accurately describe the static action included in the video frame, thereby improving accuracy and facilitating subsequent description of the dynamic action included in the target window according to the static action included in the video frame.

In addition, any two or three of the foregoing steps S1041 to S1043 may alternatively be combined, and combined second action feature information can be obtained. When the static action in the video frame is described by using the combined second action feature information, the static action included in the video frame can be more accurately and comprehensively described, thereby improving accuracy and facilitating subsequent description of the dynamic action included in the target window according to the static action included in the video frame.

S105: Combine second action feature information of the video frames in the target window, to obtain the first action feature information of the target window.

The first action feature information is used for describing the dynamic action included in the target window. In some embodiments, the first action feature information comprises movement of one or more body parts of a subject (e.g., a person, an animal, an object such as a car, etc.).

Each target window includes a plurality of consecutive video frames, and second action feature information of each video frame represents a static action included in the corresponding video frame. Because a dynamic action of a target window may be obtained by combining a static action in each video frame, second action feature information of a plurality of video frames in each target window is combined to obtain combined first action feature information. The first action feature information can describe a dynamic action included in the target window.

Figures 4, 5:
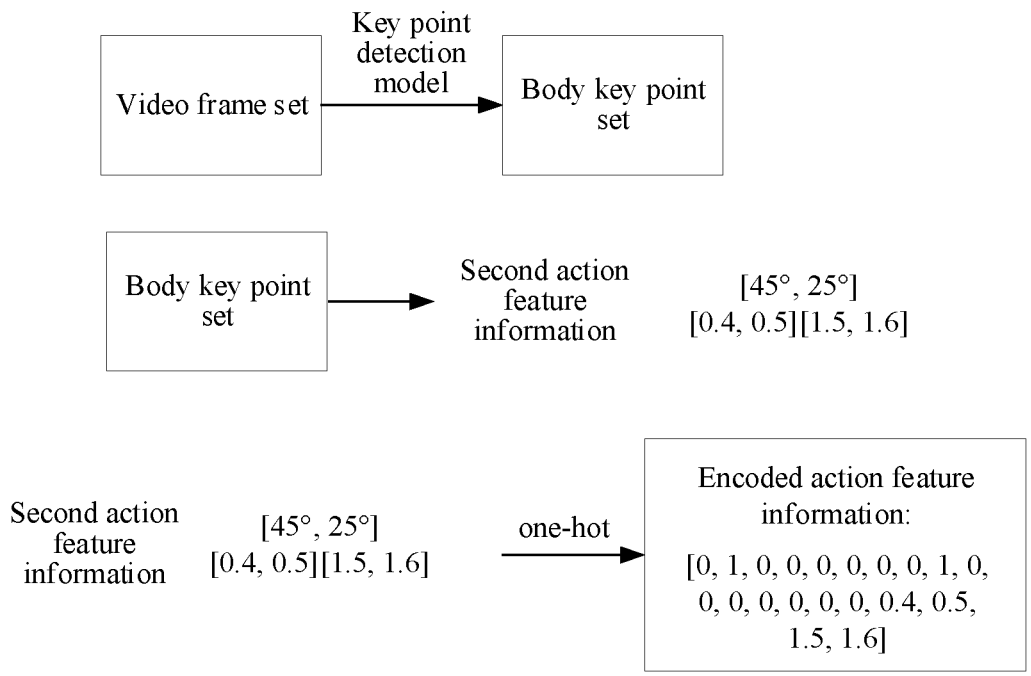
FIG. 4 is a flowchart of obtaining action feature information of a video frame according to some embodiments of this application.
FIG. 5 is a schematic diagram of a similarity matrix according to some embodiments of this application.

As shown in FIG. 4, the electronic device inputs each video frame in the video frame set into a key point detection model, determines a body key point set in each video frame based on the key point detection model; determines, according to the body key point set in the video frame, an angle 45° between an upper arm of a left hand and a left shoulder, an angle 25° between a lower arm of the left hand and the upper arm of the left hand, a displacement 0.4 of a horizontal coordinate of a left hand key point, a displacement 0.5 of a vertical coordinate of the left hand key point, a ratio 1.5 of a distance between the left hand key point and the shoulder to a shoulder width, and a ratio 1.6 of a distance between a right hand key point and the shoulder to the shoulder width; combines the obtained data to obtain second action feature information [45°, 25°][0.4, 0.5][1.5, 1.6] of the video frame; encodes the second action feature information by using one-hot, to obtain encoded action feature information [0, 1, 0, 0, 0, 0, 0, 0, 1, 0, 0, 0, 0, 0, 0, 0.4, 0.5, 1.5, 1.6]; and combines obtained encoded action feature information of each video frame, to obtain the first action feature information used for representing the dynamic action included in the target window.

S106: Obtain a similarity between the first action feature information of the target window and preset feature information.

The preset feature information is used for describing the preset dynamic action, and may be used as a feature template of the preset dynamic action. The feature template is used for subsequent matching and comparison with action feature information of the target window.

A process of obtaining the preset feature information includes: obtaining a plurality of videos including only the preset dynamic action; performing action recognition on the plurality of videos, to obtain feature information of each video; and collecting statistics according to the obtained feature information of the video, to obtain the preset feature information. Therefore, the preset feature information can represent the preset dynamic action. Manners of collecting statistics according to a plurality of pieces of feature information may be calculating a sum, calculating an average value, and the like.

In this embodiment of this application, by obtaining the similarity between the first action feature information of each target window and the preset feature information, a similarity between the first action feature information of the target window and the preset feature information can be determined, so that whether a dynamic action in the target window is the same as the preset dynamic action can be determined according to the determined similarity.

In some embodiments, the electronic device determines a first action matrix corresponding to the first action feature information, determines a preset action matrix corresponding to the preset feature information, determines a similarity between the first action matrix and the preset action matrix, and uses the determined similarity as a similarity between the first action feature information and the preset feature information.

The first action feature information is a first action matrix including M first action vectors, and the preset feature information is a preset action matrix including N preset action vectors, M and N being positive integers. In addition, both the first action matrix and the preset action matrix may be stored in the electronic device in a form of an array, or in another storage form.

For example, M is equal to 30, and each first action vector is a 38-dimensional vector combined by an encoded angle between two preset body parts, a difference between horizontal coordinates of any one of a plurality of body key points and a corresponding body key point in a reference video frame, a difference between vertical coordinates of the body key point and the corresponding body key point in the reference video frame, and a ratio of any two body parts, so that the first action matrix is a matrix of 38*30.

For example, N is equal to 20, and each preset action vector is a 38-dimensional vector combined by an encoded angle between two preset body parts, a difference between horizontal coordinates of any one of a plurality of body key points and a corresponding body key point in a reference video frame, a difference between vertical coordinates of the body key point and the corresponding body key point in the reference video frame, and a ratio of any two body parts, so that the preset action matrix is a matrix of 38*20.

The obtaining a similarity between the first action matrix and the preset action matrix may include steps S1061 to S1063:

S1061: Create a similarity matrix.

A size of the similarity matrix is determined by the quantity M of the first action vectors included in the first action matrix and the quantity N of the preset action vectors included in the preset action matrix. When each row of the similarity matrix represents one preset action vector, and each column represents one first action vector, the similarity matrix has N rows and M columns. When each row of the similarity matrix represents one first action vector, and each column represents one preset action vector, the similarity matrix has M rows and N columns.

S1062: Obtain, for a specified position corresponding to an $i^{th}$ first action vector and $j^{th}$ preset action vector in the similarity matrix, a sum of a maximum similarity among similarities of a first position, a second position, and a third position and a similarity between the $i^{th}$ first action vector and the $j^{th}$ preset action vector as a similarity of the specified position.

The first position is a position corresponding to an $(i-1)^{th}$ first action vector and the $i^{th}$ preset action vector, that is, a left side position of the specified position; the second position is a position corresponding to the $(i-1)^{th}$ first action vector and a $(j-1)^{th}$ preset action vector, that is, a lower left side position of the specified position; and the third position is a position corresponding to the $i^{th}$ first action vector and the $(j-1)^{th}$ preset action vector, that is, a lower side position of the specified position, i being a positive integer not less than 1 and not greater than M, and j being a positive integer not less than 1 and not greater than N. Therefore, similarities start to be determined from a position corresponding to the 1st first action vector and the 1st preset action vector, until a similarity of a position corresponding an $N^{th}$ first action vector and an $M^{th}$ preset action vector is determined.

In the similarity matrix, the similarity of the specified position is used for representing a similarity between a dynamic action of an $i^{th}$ frame and before the $i^{th}$ frame in the target video and a preset dynamic action of a $i^{th}$ frame and before the $j^{th}$ frame in a video in which the preset dynamic action is performed, so that the similarity can represent, to some extent, that whether the dynamic action up to the $i^{th}$ frame in the target video is the same as the preset dynamic action.

The similarity may be represented in different manners such as a Euclidean distance, a cosine similarity, a Manhattan distance, and a Mahalanobis distance, and relationships between similarities obtained in different manners and similarities, represented by the similarities, between first action feature information and preset feature information are different. For example, the Euclidean distance is negatively correlated with a similarity, and a greater Euclidean distance indicates that the first action feature information is less similar to the preset feature information. The cosine similarity is positively correlated with a similarity, and a greater cosine similarity indicates that the first action feature information is more similar to the preset feature information.

Therefore, when the similarity of the specified position is obtained according to the foregoing steps S1061 and S1062, if a similarity is positively correlated with a similarity between the first action feature information and the preset feature information, the electronic device obtains a sum of a maximum similarity among similarities of the first position, the second position, and the third position and a similarity between the $i^{th}$ first action vector and the $j^{th}$ preset action vector, and uses the sum as the similarity of the specified position. If the similarity is negatively correlated with a similarity between the first action feature information and the preset feature information, the electronic device obtains a sum of a minimum similarity among similarities of the first position, the second position, and the third position and the similarity between the $i^{th}$ first action vector and the $j^{th}$ preset action vector, and uses the sum as the similarity of the specified position.

For example, as shown in FIG. 5, the similarity matrix includes 16 positions. When a similarity of a position 6 is calculated, similarities of a position 1, a position 2, and a position 5 are obtained. The similarities are 0.4, 0.3, and 0.6, respectively. The electronic device obtains a similarity 0.1 between a first action vector and a preset action vector that correspond to the position 6, so that the similarity of the position 6 is 0.7. The electronic device sequentially determines similarities of a position 1 to a position 16 in the similarity matrix, and determines a similarity of the position 16 as the similarity between the first action feature information and the preset feature information.

In addition, the similarity matrix includes M*N positions, and the electronic device determines a similarity between a first action vector and a preset action vector that correspond to each of the M*N positions. A similarity of each position can be determined according to the determined similarity between the first action vector and the preset action vector that correspond to each position and similarities of a left side position, a lower left side position, and a lower side position of the position.

The similarity between the first action vector and the preset action vector may be represented in a plurality of manners, and the manners of representing the similarity include a Euclidean distance, a cosine similarity, a Manhattan distance, and a Mahalanobis distance, and the like.

In some embodiments, to determine a similarity of a position corresponding to an $M^{th}$ first action vector and an $N^{th}$ preset action vector, the electronic device needs to first obtain similarities of a left side position, a lower left side position, and a lower side position of the position and a similarity between the $M^{th}$ first action vector and the $N^{th}$ preset action vector. To determine the similarities of the left side position, the lower left side position, and the lower side position, similarities of left side positions, lower left side positions, and lower side positions of these positions still need to be determined. By analogy, the process continues until a position corresponding to the 1st first action vector and the 1st preset action vector is reached. In the process, some positions in the similarity matrix do not need to participate in calculation, and therefore, other positions than those that do not need to participate in calculation may be used as preset positions, and the electronic device determines only similarities of the preset positions in the similarity matrix without a need to determine similarities of other positions than the preset positions in the similarity matrix, thereby lessening a calculation workload and quickening similarity calculation.

When the specified position is located at an edge of the similarity matrix, the specified position may not have a left side position, a lower left side position, or a lower side position. Therefore, when the specified position has only two positions of the left side position, the lower left side position, and the lower side position, a greater similarity between similarities of the two positions is obtained, and a sum of a similarity between a first action vector and a preset action vector that correspond to the specified position and the greater similarity is determined as a similarity of the specified position. When the specified position has only one position of the left side position, the lower left side position, and the lower side position, a sum of a similarity between a first action vector and a preset action vector that correspond to the specified position and a similarity of the one position is directly determined as a similarity of the specified position. When the specified position does not have a left side position, a lower left side position, or a lower side position, a similarity between a first action vector and a preset action vector that correspond to the specified position is directly determined as a similarity of the specified position.

S1063: Determine a similarity of a position corresponding to an $M^{th}$ first action vector and an $N^{th}$ preset action vector in the similarity matrix as the similarity between the first action feature information and the preset feature information.

After a similarity of each position in the similarity matrix is obtained through step S1062, the electronic device determines the similarity of the position corresponding to the $M^{th}$ first action vector and the $N^{th}$ preset action vector as the similarity between the first action feature information and the preset feature information.

For example, code for calculating the similarity between the first action feature information and the preset feature information is as follows:

```
int DTWDistance(s:array[1 . . . n],t:array[1 . . . m]){
    DTW:=array[0 . . . n,0 . . . m]
    for i:=1 to n
        DTW [1,n]:=infinity
    for i:=1 to m
        DTW[1,m]:=infinity
    DTW[0,0]:=0
    for i:=1 to n
        for j:=1 to m
            cost:=d(s[i],t[j])
            DTW[i,i]:=cost+minimum(DTW[i-1,j],//insertion
                DTW[i,j-1],// deletion
                DTW[i-1,j])//match
    return DTW[n,m]
}
```

In this embodiment of this application, a first action matrix used for describing a dynamic action included in a target window is constructed, and a similarity matrix between the first action matrix and a preset action matrix is created, so that a similarity between the first action matrix and the preset action matrix can be determined according to the similarity matrix. The similarity may be used as a score provided for the target window, to measure a similarity between the dynamic action included in the target window and a preset dynamic action. Based on the idea of dynamic planning and by calculating a similarity in a down-top manner, the similarity between the dynamic action included in the target window and the preset dynamic action is quickly obtained, and accuracy is improved.

S107: Recognize a preset dynamic action included in the plurality of target windows according to at least one obtained similarity.

A plurality of target windows are extracted from the target video, and then the electronic device may obtain a similarity corresponding to first action feature information of each of the plurality of target windows. In this case, the electronic device obtains a maximum similarity among the plurality of similarities as a first similarity (e.g., a highest first similarity). When the first similarity is greater than a first preset threshold, it indicates that a similarity between a dynamic action included in a first target window and the preset dynamic action is relatively high, and the dynamic action included in the first target window corresponding to the first similarity can be considered as the preset dynamic action. When the first similarity is not greater than the first preset threshold, neither of all dynamic actions included in the plurality of target windows is considered the preset dynamic action.

When obtaining a maximum first similarity in the plurality of similarities, the electronic device may arrange the plurality of similarities in ascending order, to obtain a last similarity, the last similarity being the maximum first similarity in the plurality of similarities. Alternatively, the electronic device arranges the plurality of similarities in descending order, to obtain a first similarity, the first similarity being the maximum first similarity in the plurality of similarities.

For example, when obtained similarities are 0.4, 0.5, 0.6, 0.7, 0.8, and the first preset threshold is 0.7, a maximum similarity 0.8 is obtained, and the similarity 0.8 is greater than the first preset threshold, so that a dynamic action included in a first target window corresponding to the similarity 0.8 is determined as the preset dynamic action.

In this embodiment of this application, when the first similarity is greater than the first preset threshold, a second target window adjacent to the first target window corresponding to the first similarity is obtained; a difference between a second similarity corresponding to first action feature information of the second target window and the first similarity is determined; and when the difference is greater than a second preset threshold, the dynamic action included in the first target window is determined as the preset dynamic action.

By determining whether the difference between the second similarity corresponding to the second target window and the first similarity is greater than the second preset threshold, the electronic device can determine whether a difference between the dynamic action included in the first target window and a dynamic action included in the second target window is sufficiently large. When the difference between the dynamic action included in the first target window and the dynamic action included in the second target window is sufficiently large, it indicates that a difference between the dynamic action included in the second target window and the preset dynamic action is relatively large. That is, the dynamic action included in the first target window has ended, and the dynamic action in the first target window can be determined as the preset dynamic action. When the difference between the dynamic action included in the first target window and the dynamic action included in the second target window is insufficiently large, it indicates that a difference between the dynamic action included in the second target window and the preset dynamic action is relatively small. That is, the dynamic action included in the first target window has not ended yet, and the dynamic action included in the first target window and the dynamic action included in the second target window may be consecutive actions. In this case, the dynamic action in the first target window is not determined as the preset dynamic action.

Figure 6:
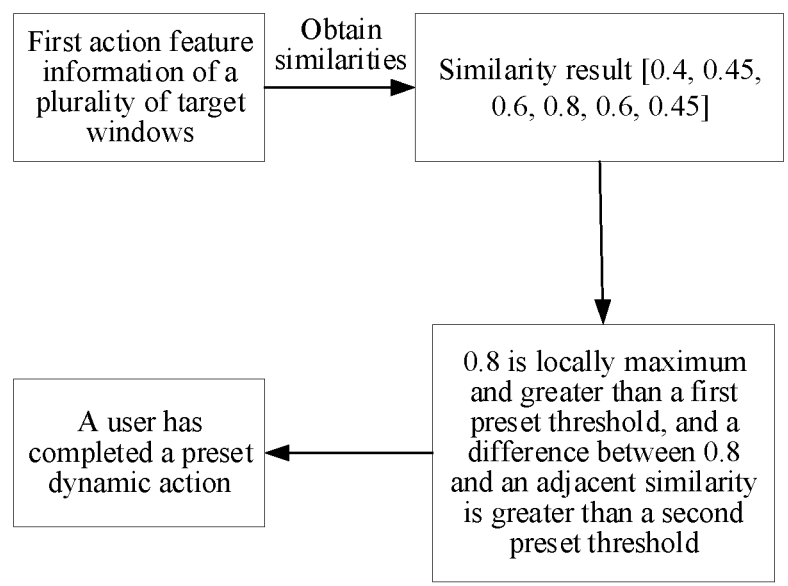
FIG. 6 is a flowchart of determining a preset dynamic action according to some embodiments of the present disclosure.

As shown in FIG. 6, first action feature information of a plurality of target windows is obtained, and a similarity between first action feature information in each target window and preset action feature information is obtained. An exemplary obtained similarity result is [0.4, 0.45, 0.6, 0.8, 0.6, 0.45]. Whether 0.8 is the local maximum similarity is determined, whether 0.8 is greater than the first preset threshold is determined, and whether a difference between 0.8 and 0.6 is greater than the second preset threshold is determined. Therefore, it can be determined that the user has completed the preset dynamic action.

When the plurality of target windows are obtained and a maximum first similarity among similarities of the plurality of target windows is greater than the first preset threshold, a second target window adjacent to the first target window corresponding to the first similarity is obtained. When there is one second target window adjacent to the first target window, the electronic device determines a difference between the first target window and the second target window; and when the difference is greater than the second preset threshold, the dynamic action included in the first target window is determined as the preset dynamic action. When there are two second target windows adjacent to the first target window, the electronic device determines a difference between the first target window and each of the two second target windows, to obtain two differences; and when both of the two differences are greater than the second preset threshold, the electronic device determines the dynamic action included in the first target window as the preset dynamic action.

In this embodiment of this application, description is made by merely using an example in which merely a dynamic action of one object in the target video is recognized. In another embodiment, when the target video includes a plurality of objects, body key points in each video frame can be determined by using a key point detection model, and an object to which each body key point belongs can be determined. Therefore, steps S104 to S107 may be separately performed according to body key points of each object, so that whether a dynamic action of each object is the preset dynamic action can be determined.

The action recognition method in this embodiment of this application is described by merely using an example in which an execution body is an electronic device. In another embodiment, the execution body of the action recognition method may alternatively be a server. An electronic device transmits a target video to the server, and the server performs steps S101 to S107, to determine whether a dynamic action included in a target window is a preset dynamic action, and transmits an execution result to the electronic device.

The server may be one server, a server cluster including several servers, or a cloud computing service center.

In the action recognition method provided in this embodiment of this application, a plurality of target windows are extracted from a target video; first action feature information of each target window is obtained according to video frames in the target window, the first action feature information being used for describing a dynamic action included in the target window; a similarity between the first action feature information of each target window and preset feature information is obtained, the preset feature information being used for describing a preset dynamic action. When a maximum first similarity in a plurality of obtained similarities is greater than a first preset threshold, and a difference between the first similarity and a second similarity corresponding to an adjacent target window is greater than a second preset threshold, it indicates that a difference between a dynamic action in a first target window corresponding to the first similarity and a dynamic action in an adjacent target window is sufficiently large, and the dynamic action in the first target window is not subject to an impact from the dynamic action in the adjacent target window. Therefore, the dynamic action included in the first target window is determined as the preset dynamic action. This embodiment of this application provides a solution for recognizing a preset dynamic action, so that action recognition can be performed on video frames in a target window by using a target window in a target video as a unit, to recognize a preset dynamic action included in the target window, thereby eliminating the limit that only static actions can be recognized in the related art, expanding an application range, and improving flexibility. Whether actions in adjacent target windows affect each other is determined by calculating a difference between similarities of the adjacent target windows, thereby avoiding a recognition error caused by impacts between adjacent target windows, and improving accuracy. A process of recognizing a dynamic action is not limited by a dynamic action frequency, so that a preset dynamic action of any frequency can be recognized, thereby improving robustness in dynamic action recognition.

In addition, based on the idea of dynamic planning and by calculating a similarity in a down-top manner, the similarity between the dynamic action included in the target window and the preset dynamic action is quickly obtained, and accuracy is improved.

In the related art, if there is only a static action image, only a static action performed by a user at a time point can be recognized according to the static action image, and a complete dynamic action performed by the user cannot be recognized. Therefore, in this recognition manner, human-machine interaction with the user cannot be naturally performed, and an interaction effect is very stiff. If a dynamic action of the user needs to be recognized, assistance of another sensing device is required, which also increases hardware costs and causes inconvenience in use. In this embodiment of this application, a preset dynamic action performed by the user can be recognized according to a dynamic action video, rather than a static action at a time point. Therefore, in this recognition manner, human-machine interaction with the user can be naturally performed, and an interaction effect is improved. In addition, no sensing device needs to be additionally added, so that fewer hardware devices are required, and operation is convenient.

Figure 7:
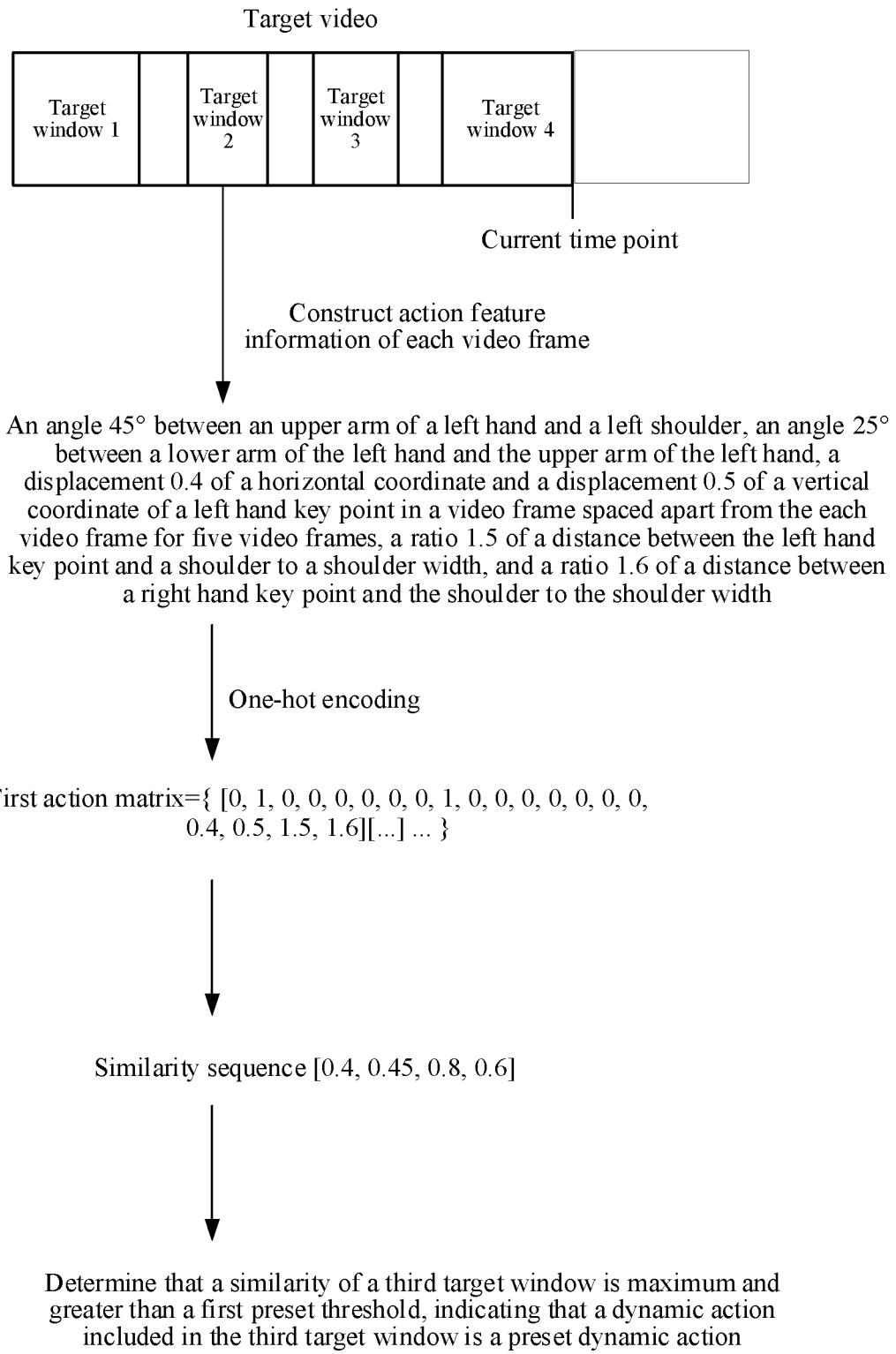
FIG. 7 is a flowchart of an action recognition method according to some embodiments of this application.

FIG. 7 is a flowchart of an action recognition method according to some embodiments of this application. As shown in FIG. 7, the method includes the following steps:

S701: Extract four target windows from a target video, each of the target windows including a plurality of consecutive video frames.

S702: Determine second action feature information of each video frame in the target windows:

an angle 45° between an upper arm of a left hand and a left shoulder, an angle 25° between a lower arm of the left hand and the upper arm of the left hand, a displacement 0.4 of a horizontal coordinate and a displacement 0.5 of a vertical coordinate of a left hand key point in a video frame spaced apart from the video frame in the target window for five video frames, a ratio 1.5 of a distance between the left hand key point and the shoulder to a shoulder width, and a ratio 1.6 of a distance between a right hand key point and the shoulder to the shoulder width. Then, second action feature information obtained through combination is [45°, 25°][0.4, 0.5][1.5, 1.6].

S703: Perform one-hot encoding on the combined second action feature information, to obtain action feature information [0, 1, 0, 0, 0, 0, 0, 0, 1, 0, 0, 0, 0, 0, 0, 0.4, 0.5, 1.5, 1.6], which is used for representing the each video frame, and combine action feature information of each video frame, to obtain a first action matrix M {[0, 1, 0, 0, 0, 0, 0, 0, 1, 0, 0, 0, 0, 0, 0, 0.4, 0.5, 1.5, 1.6] [ ... ] ... }, which is used for describing the target window.

S704: Determine a similarity between a first action matrix and a preset feature matrix of each target window, to obtain a similarity sequence [0.4, 0.45, 0.8, 0.6].

S705: Determine that a similarity of a third target window is maximum and is greater than a first preset threshold, indicating that a dynamic action included in the third target window is used as a preset dynamic action.

Some embodiments of the present disclosure further provides a human-machine interaction method. The method may include the following steps:

1. An electronic device photographs an action video of a user by using a camera disposed on the electronic device, and uses the photographed video as a target video.

The camera is disposed on the electronic device, and the electronic device photographs the action video of the user by using the camera.

A preset dynamic action is preset in the electronic device. When the user is within a photographing range of the camera of the electronic device, the electronic device may photograph an action of the user by using the camera, and may subsequently determine whether the action of the user is the preset dynamic action.

For example, the electronic device may display prompt information. The prompt information may include a picture of the preset dynamic action and information prompting the user to perform the preset dynamic action.

2. Extract a plurality of target windows from the target video, each of the plurality of target windows including a first preset quantity of consecutive video frames.

3. Perform action recognition on the video frames in the target window, to obtain first action feature information of the target window, the first action feature information being used for describing a dynamic action included in the target window.

4. Obtain a similarity between the first action feature information of the target window and preset feature information, the preset feature information being used for describing the preset dynamic action, and a maximum similarity in a plurality of obtained similarities being a first similarity.

5. Determine a dynamic action included in a first target window corresponding to the first similarity as the preset dynamic action when the first similarity is greater than a first preset threshold and a difference between the first similarity and a second similarity is greater than a second preset threshold, the second similarity being a similarity corresponding to first action feature information of a target window adjacent to the first target window.

Steps 2 to 5 are similar to steps S101 to S107, and details are not described herein again.

6. The electronic device performs an interactive operation corresponding to the preset dynamic action.

When the dynamic action included in the first target window is determined as the preset dynamic action, it indicates that the user has performed the preset dynamic action. In this case, the electronic device may perform the interactive operation corresponding to the preset dynamic action.

In some embodiments, that the electronic device performs an interactive operation corresponding to the preset dynamic action includes at least one of the following steps:

S601: The electronic device determines that verification on the action of the user is successful, and displays a preset dynamic effect indicating that the verification is successful.

For example, the electronic device is a motion sensing game console. The motion sensing game console obtains a video of an action performed by the user, and when the action of the user matches the preset dynamic action, it is determined that verification on the action of the user is successful, and the motion sensing game console displays a preset dynamic effect for completing the action, thereby instructing the user to properly perform the preset dynamic action. The preset dynamic effect may be a display effect such as a flower scattering effect or an effect of gradual disappearing of the displayed preset dynamic action.

S602: The electronic device allocates virtual reward data corresponding to the preset dynamic action to the user.

The electronic device performs login based on a user identifier. The user identifier is used for determining a unique user, and may be a user account, a phone number, or the like. In addition, the electronic device further manages an account for the user identifier, and various data allocated to the user may be stored in the account.

Therefore, when the electronic device determines the dynamic action included in the first target window as the preset dynamic action, it indicates that the user has performed the preset dynamic action. In this case, virtual reward data corresponding to the preset dynamic action may be allocated to the user. That is, add the virtual reward data to the account for the user identifier.

Virtual reward data corresponding to different preset dynamic actions may be the same or different. The virtual reward data may include a virtual gift, virtual currency, a virtual score, and the like.

For example, the electronic device is a motion sensing game console. The motion sensing game console obtains a video of an action performed by the user, and adds a reward score to the user when determining that the action of the user matches the preset dynamic action. The obtained reward score increases as the user properly performs more dynamic actions.

S603: The electronic device allocates an operation permission corresponding to the preset dynamic action to the user.

The electronic device performs login based on a user identifier. The user identifier is used for determining a unique user, and may be a user account, a phone number, or the like. In addition, the electronic device further configures an operation permission for the user identifier. Only when the operation permission is allocated to the user identifier, the user is allowed to perform a corresponding operation.

Therefore, when the electronic device determines the dynamic action included in the first target window as the preset dynamic action, it indicates that the user has performed the preset dynamic action. In this case, the operation permission corresponding to the preset dynamic action can be allocated to the user.

For example, the electronic device is an access control device. The access control device obtains a video of an action performed by the user, and when determining that the action of the user is the same as the preset dynamic action, determines verification on the action of the user is successful. Then, the access control device is enabled, to allow the user to enter.

For example, the electronic device is a motion sensing game console. The motion sensing game console obtains a video of an action performed by the user, and when determining that the action of the user is the same as the preset dynamic action, determines that verification on the action of the user is successful. Then, the current round of game is passed through, and a next ground of game starts.

In the human-machine interaction method provided in this embodiment of this application, a dynamic action performed by a user can be recognized; and a corresponding interactive operation is performed according to the dynamic action performed by the user, to interact with the user. This provides a new accurate interaction manner.

Figure 8:
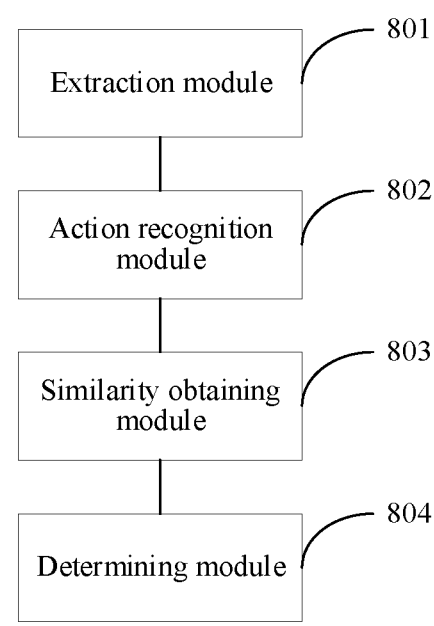
FIG. 8 is a schematic structural diagram of an action recognition apparatus according to some embodiments of this application.

FIG. 8 is a schematic structural diagram of an action recognition apparatus according to some embodiments of this application. As shown in FIG. 8, the apparatus includes:
an extraction module 801, configured to extract a plurality of target windows from a target video, each of the plurality of target windows including a first preset quantity of consecutive video frames;
an action recognition module 802, configured to perform action recognition on the video frames in the target window, to obtain first action feature information of the target window, the first action feature information being used for describing a dynamic action included in the target window;
a similarity obtaining module 803, configured to obtain a similarity between the first action feature information of the target window and preset feature information, the preset feature information being used for describing a preset dynamic action, and a maximum similarity in a plurality of obtained similarities being a first similarity; and
a determining module 804, configured to determine a dynamic action included in a first target window corresponding to the first similarity as the preset dynamic when the first similarity is greater than a first preset threshold and a difference between the first similarity and a second similarity is greater than a second preset threshold, the second similarity being a similarity corresponding to first action feature information of a target window adjacent to the first target window.

This embodiment of this application provides a solution for recognizing a preset dynamic action, so that action recognition can be performed on video frames in a target window by using a target window in a target video as a unit, to recognize a preset dynamic action included in the target window, thereby eliminating the limit that only static actions can be recognized in the related art, expanding an application range, and improving flexibility. Whether actions in adjacent target windows affect each other is determined by calculating a difference between similarities of the adjacent target windows, thereby avoiding a recognition error caused by impacts between adjacent target windows, and improving accuracy.

Figure 9:
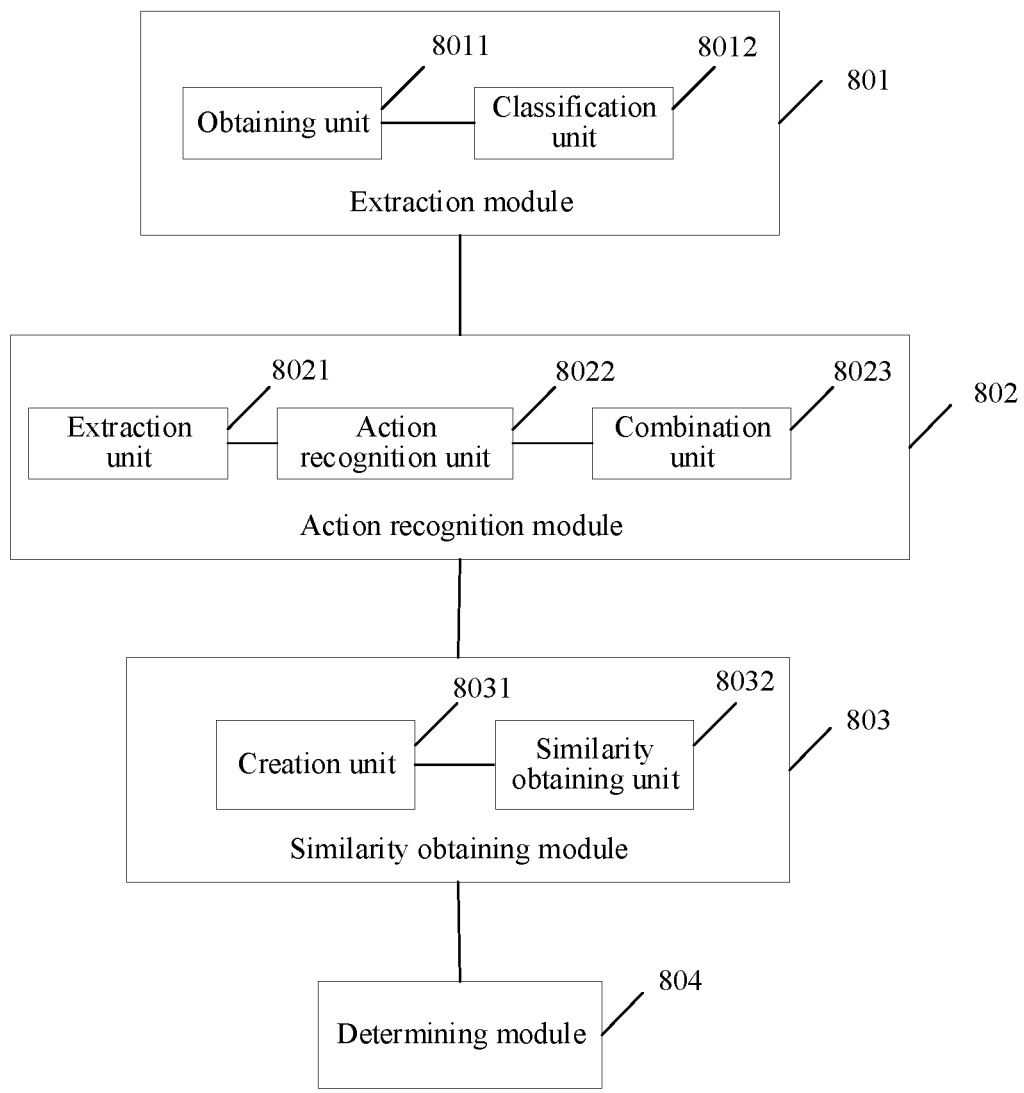
FIG. 9 is a schematic structural diagram of another action recognition apparatus according to some embodiments of this application.

In some embodiments, as shown in FIG. 9, the extraction module 801 includes:
an obtaining unit 8011, configured to extract a plurality of video frames from the target video; and
a classification unit 8012, configured to classify the plurality of video frames with the first preset quantity as a quantity of video frames in each target window and a second preset quantity as a quantity of same video frames included in any two adjacent target windows, to obtain the plurality of target windows.

In some embodiments, as shown in FIG. 9, the action recognition module 802 includes:
an extraction unit 8021, configured to extract, for each video frame in the target window, a plurality of body key points in the video frame;
an action recognition unit 8022, configured to perform action recognition on the video frame according to a distribution of the plurality of body key points, to obtain second action feature information of the video frame, the second action feature information being used for describing a static action included in the video frame; and
a combination unit 8023, configured to combine second action feature information of the video frames in the target window, to obtain the first action feature information of the target window.

The preset dynamic action is performed by at least two preset body parts; and the action recognition unit 8022 is further configured to perform at least one of the following:
determining an angle between any two preset body parts in the video frame according to coordinates of the plurality of body key points in the video frame and body parts to which the plurality of body key points belong, and using the angle as the second action feature information;
obtaining a displacement amount between at least one of the plurality of body key points and a body key point corresponding to a reference video frame, and using the displacement amount as the second action feature information, the reference video frame being previous to the video frame by a third preset quantity of video frames; and
obtaining a size of a reference body part in any two preset body parts and a distance between the any two preset body parts, and using a ratio of the distance to the size of the reference body part as the second action feature information.

In some embodiments, the first action feature information is a first action matrix including M first action vectors, and the preset feature information is a preset action matrix including N preset action vectors, M and N being positive integers; and the similarity obtaining module 803 includes:
a creation unit 8033, configured to create a similarity matrix, the similarity matrix having M rows and N columns, or N rows and M columns;
a similarity obtaining unit 8034, configured to obtain, for a specified position corresponding to an $i^{th}$ first action vector and $j^{th}$ preset action vector in the similarity matrix, a sum of a maximum similarity among similarities of a first position, a second position, and a third position and a similarity between the $i^{th}$ first action vector and the $i^{th}$ preset action vector as a similarity of the specified position, the first position being a position corresponding to an $(i-1)^{th}$ first action vector and the $j^{th}$ preset action vector, the second position being a position corresponding to the $(i-1)^{th}$ first action vector and a $(j-1)^{th}$ preset action vector, and the third position being a position corresponding to the $i^{th}$ first action vector and the $(j-1)^{th}$ preset action vector, i being a positive integer not less than 1 and not greater than M, and j being a positive integer not less than 1 and not greater than N; and
the similarity obtaining unit 8034 being further configured to determine a similarity of a position corresponding to an $M^{th}$ first action vector and an $N^{th}$ preset action vector in the similarity matrix as the similarity between the first action feature information and the preset feature information.

The action recognition apparatus provided in the foregoing embodiments is illustrated by merely using an example of division of the foregoing functional modules during action recognition. In actual application, the foregoing functions may be allocated to and completed by different functional modules according to requirements, that is, the internal structure of an electronic device is divided into different functional modules, so as to complete all or some of the functions described above. In addition, the embodiments of the action recognition apparatus and the action recognition method provided in the foregoing embodiments belong to the same conception. For the specific implementation process, refer to the method embodiments, and details are not described herein again.

Figure 10:
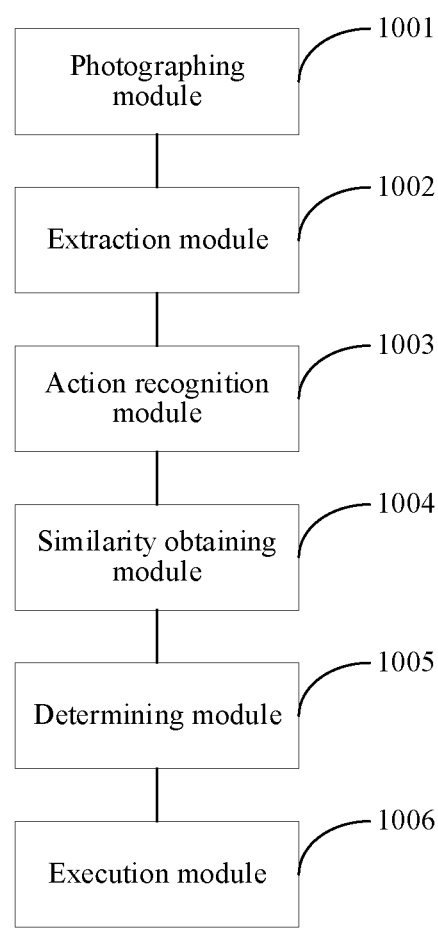
FIG. 10 is a schematic structural diagram of a human-machine interaction apparatus according to some embodiments of this application.

FIG. 10 is a schematic structural diagram of a human-machine interaction apparatus according to some embodiments of this application. As shown in FIG. 10, the apparatus includes:

a photographing module 1001, configured to photograph an action video of a user by using a configured camera, as a target video;

an extraction module 1002, configured to extract a plurality of target windows from a target video, each of the plurality of target windows including a first preset quantity of consecutive video frames;

an action recognition module 1003, configured to perform action recognition on the video frames in the target window, to obtain first action feature information of the target window, the first action feature information being used for describing a dynamic action included in the target window;

a similarity obtaining module 1004, configured to obtain a similarity between the first action feature information of the target window and preset feature information, the preset feature information being used for describing a preset dynamic action, and a maximum similarity in a plurality of obtained similarities being a first similarity;

a determining module 1005, configured to determine a dynamic action included in a first target window corresponding to the first similarity as the preset dynamic action when the first similarity is greater than a first preset threshold and a difference between the first similarity and a second similarity is greater than a second preset threshold, the second similarity being a similarity corresponding to first action feature information of a target window adjacent to the first target window; and an execution module 1006, configured to perform an interactive operation corresponding to the preset dynamic action.

By using the human-machine interaction apparatus provided in this embodiment of this application, a dynamic action performed by a user can be recognized; and a corresponding interactive operation is performed according to the dynamic action performed by the user, to interact with the user. This provides a new accurate interaction manner.

In some embodiments, the execution module is configured to perform at least one of the following:

determining that verification on an action of the user is successful, and displaying a preset dynamic effect indicating that the verification is successful;

allocating virtual reward data corresponding to the preset dynamic action to the user; and allocating an operation permission corresponding to the preset dynamic action to the user.

The human-machine interaction apparatus provided in the foregoing embodiments is illustrated by merely using an example of division of the foregoing functional modules during human-machine interaction. In actual application, the foregoing functions may be allocated to and completed by different functional modules according to requirements, that is, the internal structure of an electronic device is divided into different functional modules, so as to complete all or some of the functions described above. In addition, the embodiments of the human-machine interaction apparatus and the human-machine interaction method provided in the foregoing embodiments belong to the same conception. For the specific implementation process, refer to the method embodiments, and details are not described herein again.

Figure 11:
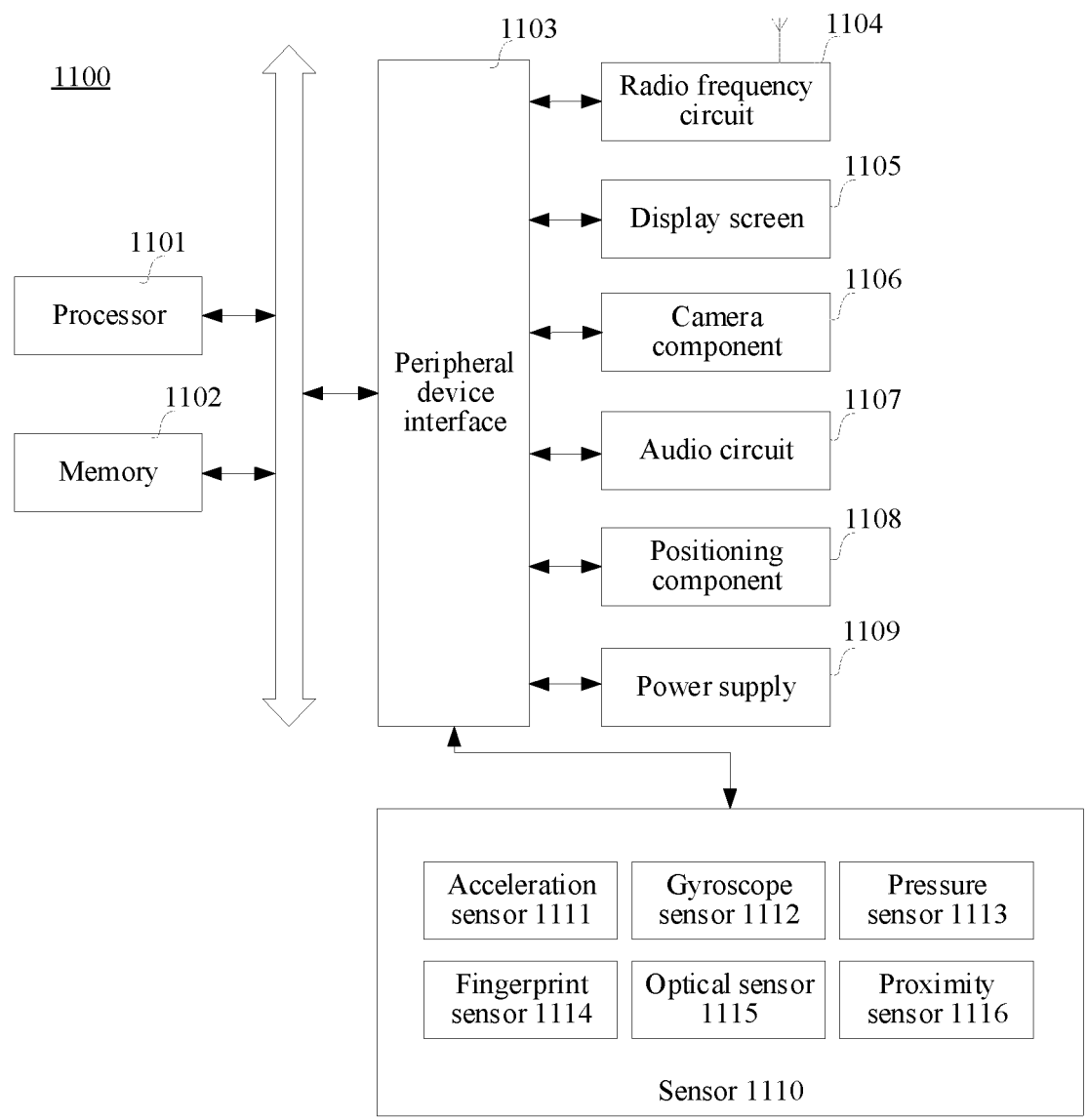
FIG. 11 is a schematic structural diagram of an electronic device according to some embodiments of this application.

FIG. 11 is a schematic structural diagram of an electronic device according to some embodiments of this application. The electronic device 1100 may be a motion sensing game console, an access control device, smartphone, a tablet computer, a Moving Picture Experts Group Audio Layer III (MP3) player, a Moving Picture Experts Group Audio Layer IV (MP4) player, a notebook computer, a desktop computer, a head-mounted device, or any another intelligent electronic device. The electronic device 1100 may also be referred to as other names such as user equipment, a portable electronic device, a laptop electronic device, and a desktop electronic device.

Generally, the electronic device 1100 includes a processor 1101 and a memory 1102.

The processor 1101 may include one or more processing cores, and may be, for example, a 4-core processor or an 8-core processor. The processor 1101 may be implemented by using at least one hardware form of digital signal processor (DSP), a field-programmable gate array (FPGA), and a programmable logic array (PLA). The processor 1101 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 1101 may be integrated with a graphics processing unit (GPU). The GPU is configured to be responsible for rendering and drawing content that a display screen needs to display. In some embodiments, the processor 1101 may further include an artificial intelligence (AI) processor. The AI processor is configured to process a calculation operation related to machine learning.

The memory 1102 may include one or more computer-readable storage media. The computer-readable storage medium may be non-transient. The memory 1102 may further include a high-speed random access memory and a non-volatile memory, for example, one or more magnetic disk storage devices or flash memory devices. In some embodiments, the non-transient computer-readable storage medium in the memory 1102 is configured to store at least one instruction, and the at least one instruction is configured to be executed by the processor 1101 to implement the action recognition method provided in the method embodiment of this application.

In some embodiments, the electronic device 1100 may further optionally include a peripheral device interface 1103 and at least one peripheral device. The processor 1101, the memory 1102, and the peripheral device interface 1103 may be connected by using a bus or a signal cable. Each peripheral device may be connected to the peripheral device interface 1103 by using a bus, a signal cable, or a circuit board. Specifically, the peripheral device includes at least one of a radio frequency (RF) circuit 1104, a touch display screen 1105, a camera 1106, an audio circuit 1107, a positioning assembly 1108, and a power supply 1109.

The peripheral device interface 1103 may be configured to connect at least one peripheral device related to input/output (I/O) to the processor 1101 and the memory 1102. In some embodiments, the processor 1101, the memory 1102, and the peripheral device interface 1103 are integrated into the same chip or circuit board. In some other embodiments, any one or two of the processor 1101, the memory 1102, and the peripheral device interface 1103 may be implemented on an independent chip or circuit board, and the implementation is not limited in this embodiment.

The RF circuit 1104 is configured to receive and transmit an RF signal, also referred to as an electromagnetic signal. The RF circuit 1104 communicates with a communication network and another communication device by using the electromagnetic signal. The RF circuit 1104 converts an electric signal into an electromagnetic signal for transmission, or converts a received electromagnetic signal into an electric signal. Optionally, the radio frequency circuit 1104 includes an antenna system, an RF transceiver, one or more amplifiers, a tuner, an oscillator, a digital signal processor, a codec chip set, a subscriber identity module card, and the like. The RF circuit 1104 may communicate with other electronic devices through at least one wireless communication protocol. The wireless communication protocol includes, but is not limited to, a metropolitan area network, generations for mobile communication networks (2G, 3G, 4G, and 5G), a wireless local area network, and/or a wireless fidelity (Wi-Fi) network. In some embodiments, the RF 1104 may further include a circuit related to Near-Field Communication (NFC), which is not limited in this application.

The display screen 1105 is configured to display a user interface (UI). The UI may include a graph, text, an icon, a video, and any combination thereof. When the display screen 1105 is a touchscreen, the display screen 1105 is further capable of collecting a touch signal on or above a surface of the display screen 1105. The touch signal may be used as a control signal to be inputted into the processor 1101 for processing. In this case, the display screen 1105 may be further configured to provide a virtual button and/or a virtual keyboard that are/is also referred to as a soft button and/or a soft keyboard. In some embodiments, there may be one display screen 1105, disposed on a front panel of the electronic device 1100. In some other embodiments, there may be at least two display screens 1105, respectively disposed on different surfaces of the electronic device 1100 or designed in a foldable shape. In still some other embodiments, the display screen 1105 may be a flexible display screen, disposed on a curved surface or a folded surface of the electronic device 1100. Even, the display screen 1105 may be further set in a non-rectangular irregular pattern, that is, a special-shaped screen. The touch display screen 1105 may be configured by using materials such as a liquid crystal display (LCD), an organic light-emitting diode (OLED), and the like.

The camera component 1106 is configured to acquire an image or a video. Optionally, the camera component 1106 includes a front-facing camera and a rear-facing camera. Generally, the front-facing camera is disposed in the front panel of the electronic device, and the rear-facing camera is disposed in the rear face of the electronic device. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1106 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1107 may include a microphone and a speaker. The microphone is configured to collect sound waves of a user and an environment, and convert the sound waves into electrical signals and input the electrical signals into the processor 1101 for processing, or input the electrical signals into the RF circuit 1104 to implement speech communication. For the purpose of stereo sound collection or noise reduction, there may be a plurality of microphones, respectively disposed at different parts of the electronic device 1100. The microphone may further be an array microphone or an omni-directional collection type microphone. The speaker is configured to convert electrical signals from the processor 1101 or the RF circuit 1104 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1107 may further include an earphone jack.

The positioning component 1108 is configured to position a current geographic location of the electronic device 1100, to implement a navigation or a location-based service (LBS). The positioning component 1108 may be a positioning component based on the Global Positioning System (GPS) of the United States, the BeiDou system of China, the GLONASS System of Russia, or the GALILEO System of the European Union.

The power supply 1109 is configured to supply power to components in the electronic device 1100. The power supply 1109 may be an alternating current, a direct current, a primary battery, or a rechargeable battery. When the power supply 1109 includes the rechargeable battery, the rechargeable battery may be a wired rechargeable battery or a wireless rechargeable battery. The rechargeable battery may be further configured to support a fast charging technology.

In some embodiments, the electronic device 1100 further includes one or more sensors 1110. The one or more sensors 1110 include, but are not limited to: an acceleration sensor 1111, a gyroscope sensor 1112, a pressure sensor 1113, a fingerprint sensor 1114, an optical sensor 1115, and a proximity sensor 1116.

The acceleration sensor 1111 may detect acceleration on three coordinate axes of a coordinate system established by the electronic device 1100. For example, the acceleration sensor 1111 may be configured to detect components of gravity acceleration on the three coordinate axes. The processor 1101 may control, according to a gravity acceleration signal collected by the acceleration sensor 1111, the touch display screen 1105 to display the UI in a transverse view or a longitudinal view. The acceleration sensor 1111 may be further configured to collect game or user motion data.

The gyroscope sensor 1112 may detect a body direction and a rotation angle of the electronic device 1100. The gyroscope sensor 1112 may cooperate with the acceleration sensor 1111 to collect a 3D action by the user on the electronic device 1100. The processor 1101 may implement the following functions according to data collected by the gyroscope sensor 1112: motion sensing (for example, the UI is changed according to a tilt operation of a user), image stabilization during shooting, game control, and inertial navigation.

The pressure sensor 1113 may be disposed on a side frame of the electronic device 1100 and/or a lower layer of the touch display screen 1105. When the pressure sensor 1113 is disposed at the side frame of the electronic device 1100, a holding signal of the user on the electronic device 1100 may be detected, and left/right hand recognition or a quick action may be performed by the processor 1101 according to the holding signal collected by the pressure sensor 1113. When the pressure sensor 1113 is disposed on the low layer of the touch display screen 1105, the processor 1101 controls, according to a pressure operation of the user on the touch display screen 1105, an operable control on the UI. The operable control includes at least one of a button control, a scroll-bar control, an icon control, and a menu control.

The fingerprint sensor 1114 is configured to collect a fingerprint of a user, and the processor 1101 recognizes an identity of the user according to the fingerprint collected by the fingerprint sensor 1114, or the fingerprint sensor 1114 recognizes the identity of the user based on the collected fingerprint. When the identity of the user is identified as a trusted identity, the processor 1101 authorizes the user to perform a related sensitive operation. The sensitive operation includes unlocking a screen, viewing encrypted information, downloading software, making payment, changing settings, and the like. The fingerprint sensor 1114 may be disposed on a front face, a rear face, or a side face of the electronic device 1100. When a physical button or a vendor logo is disposed on the electronic device 1100, the fingerprint sensor 1114 may be integrated with the physical button or the vendor logo.

The optical sensor 1115 is configured to collect ambient light intensity. In some embodiments, the processor 1101 may control the display luminance of the touch display screen 1105 according to the ambient light intensity collected by the optical sensor 1115. Specifically, when the ambient light intensity is relatively high, the display brightness of the touch display screen 1105 is turned up. When the ambient light intensity is relatively low, the display brightness of the touch display screen 1105 is turned down. In another embodiment, the processor 1101 may further dynamically adjust shooting parameters of the camera component 1106 according to the ambient light intensity collected by the optical sensor 1115.

The proximity sensor 1116, also referred to as a distance sensor, is usually disposed on the front panel of the electronic device 1100. The proximity sensor 1116 is configured to collect a distance between the user and a front face of the electronic device 1100. In some embodiments, when the proximity sensor 1116 detects that the distance between the user and the front face of the electronic device 1100 is gradually decreased, the processor 1101 controls the touch display screen 1105 to switch from a screen-on state to a screen-off state. When the proximity sensor 1116 detects that the distance between the user and the front face of the electronic device 1100 is gradually increased, the processor 1101 controls the touch display screen 1105 to switch from the screen-off state to the screen-on state.

A person skilled in the art may understand that a structure shown in FIG. 11 constitutes no limitation on the electronic device 1100, and the electronic device may include more or fewer components than those shown in the figure, or some components may be combined, or a different component deployment may be used.

Figure 12:
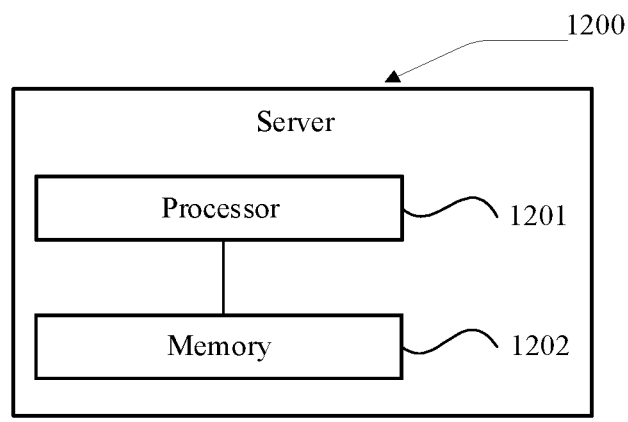
FIG. 12 is a schematic structural diagram of a server according to some embodiments of this application.

FIG. 12 is a schematic structural diagram of a server according to some embodiments of this application. The server 1200 may vary greatly due to different configurations or performance, and may include one or more processors (such as CPUs) 1201 and one or more memories 1202. The memory 1202 stores at least one instruction, the at least one instruction being loaded and executed by the processor 1201 to implement the methods provided in the foregoing method embodiments. Certainly, the server may further have a wired or wireless network interface, a keyboard, an I/O interface and other components to facilitate I/O. The server may further include other components for implementing device functions. Details are not described herein again.

The server 1200 may be configured to perform the steps performed by the electronic device in the foregoing action recognition method or human-machine interaction method.

Some embodiments of this application further provides an electronic device, including a processor and a memory, the memory storing computer-readable instructions, the computer-readable instructions, when executed by the processor, causing the processor to perform steps in the foregoing action recognition method.

Some embodiments of this application further provides an electronic device, including a processor and a memory, the memory storing computer-readable instructions, the computer-readable instructions, when executed by the processor, causing the processor to perform steps in the foregoing human-machine interaction method.

Some embodiments of this application further provides a non-volatile computer-readable storage medium, storing computer-readable instructions, the computer-readable instructions, when executed by one or more processors, causing the one or more processors to perform steps in the foregoing action recognition method.

Some embodiments of this application further provides a non-volatile computer-readable storage medium, storing computer-readable instructions, the computer-readable instructions, when executed by one or more processors, causing the one or more processors to perform steps in the foregoing human-machine interaction method.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of this application, but are not intended to limit this application. Any modification, equivalent replacement, or improvement made without departing from the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs action recognition and/or human-machine interaction. In practical application, the foregoing functions may be allocated to and completed by different functional modules according to requirements, that is, an inner structure of a device is divided into different functional modules to implement all or a part of the functions described above.

What is claimed is:

1. An action recognition method, performed by an electronic device, the method comprising:
    extracting a plurality of target windows from a target video, each of the plurality of target windows comprising a respective plurality of consecutive video frames;
    for each of the plurality of target windows:
        performing action recognition on the respective plurality of consecutive video frames corresponding to the target window to obtain respective first action feature information of the target window, the first action feature information comprising movement of one or more body parts of a subject and is used for describing a dynamic action comprised in the target window; and
        obtaining a similarity between the first action feature information of the target window and preset feature information, the preset feature information being used for describing a preset dynamic action;
    determining, from the respective obtained similarities corresponding to the plurality of target windows, a highest first similarity and a first target window corresponding to the highest first similarity; and
    determining a dynamic action corresponding to the highest first similarity as the preset dynamic action when (i) the highest first similarity is greater than a first preset threshold and (ii) a difference between the highest first similarity and a second similarity is greater than a second preset threshold, the second similarity being a similarity between respective first action feature information of a target window adjacent to the first target window and the preset feature information.

2. The method according to claim 1, wherein extracting the plurality of target windows from a target video further comprises:
    classifying the plurality of video frames.

3. The method according to claim 1, wherein performing the action recognition on the respective plurality of consecutive video frames further comprises:
    extracting, for each of the video frames, a plurality of body key points in the video frame;
    performing action recognition on the video frame according to a distribution of the plurality of body key points, to obtain second action feature information of the video frame, the second action feature information is used for describing a static action comprised in the video frame; and
    combining a plurality of second action feature information of the video frames in the target window, to obtain the first action feature information of the target window.

4. The method according to claim 3, wherein the preset dynamic action is performed using at least two preset body parts; and performing action recognition on the video frame according to the distribution comprises one or more of:
    determining an angle between any two preset body parts in the video frame according to coordinates of the plurality of body key points in the video frame and body parts to which the plurality of body key points belong, and using the angle as the second action feature information;
    obtaining a displacement amount between at least one of the plurality of body key points and a body key point corresponding to a reference video frame, and using the displacement amount as the second action feature information, the reference video frame being previous to the each video frame by a third preset quantity of video frames; and
    obtaining a size of a reference body part in any two preset body parts and a distance between the any two preset body parts, and using a ratio of the distance to the size of the reference body part as the second action feature information.

5. The method according to claim 1, wherein the first action feature information is a first action matrix comprising M first action vectors, the preset feature information is a preset action matrix comprising N preset action vectors, M and N being positive integers, and the obtaining a similarity between the first action feature information of the each target window and preset feature information comprises:
    creating a similarity matrix, the similarity matrix having M rows and N columns, or N rows and M columns;
    obtaining, for a specified position corresponding to an $i^{th}$ first action vector and a $j^{th}$ preset action vector in the similarity matrix, a sum of a maximum similarity among similarities of a first position, a second position, and a third position and a similarity between the $i^{th}$ first action vector and the $j^{th}$ preset action vector as a similarity of the specified position, the first position being a position corresponding to an $(i-1)^{th}$ first action vector and the $j^{th}$ preset action vector, the second position being a position corresponding to the $(i-1)^{th}$ first action vector and a $(j-1)^{th}$ preset action vector, and the third position being a position corresponding to the $i^{th}$ first action vector and the $(j-1)^{th}$ preset action vector, i being a positive integer not less than 1 and not greater than M, and j being a positive integer not less than 1 and not greater than N; and
    determining a similarity of a position corresponding to an $M^{th}$ first action vector and an $N^{th}$ preset action vector in the similarity matrix as the similarity between the first action feature information and the preset feature information.

6. An electronic device, comprising:
    one or more processors; and
    memory storing one or more programs that, when executed by the one or more processors, cause the one or more processors to perform operations comprising:

extracting a plurality of target windows from a target video, each of the plurality of target windows comprising a respective plurality of consecutive video frames;

for each of the plurality of target windows:
performing action recognition on the respective plurality of consecutive video frames corresponding to the target window to obtain respective first action feature information of the target window, the first action feature information comprising movement of one or more body parts of a subject and is used for describing a dynamic action comprised in the target window; and
obtaining a similarity between the first action feature information of the target window and preset feature information, the preset feature information being used for describing a preset dynamic action;

determining, from the respective obtained similarities corresponding to the plurality of target windows, a highest first similarity and a first target window corresponding to the highest first similarity; and determining a dynamic action corresponding to the highest first similarity as the preset dynamic action when (i) the highest first similarity is greater than a first preset threshold and (ii) a difference between the highest first similarity and a second similarity is greater than a second preset threshold, the second similarity being a similarity between respective first action feature information of a target window adjacent to the first target window and the preset feature information.

7. The electronic device according to claim 6, wherein extracting the plurality of target windows from a target video further comprises:
classifying the plurality of video frames.

8. The electronic device according to claim 6, wherein performing the action recognition on the respective plurality of consecutive video frames further comprises:
extracting, for each of the video frames, a plurality of body key points in the video frame;
performing action recognition on the video frame according to a distribution of the plurality of body key points, to obtain second action feature information of the video frame, the second action feature information is used for describing a static action comprised in the video frame; and
combining a plurality of second action feature information of the video frames in the target window, to obtain the first action feature information of the target window.

9. The electronic device according to claim 8, wherein the preset dynamic action is performed using at least two preset body parts; and performing action recognition on the video frame according to the distribution comprises one or more of:
determining an angle between any two preset body parts in the video frame according to coordinates of the plurality of body key points in the video frame and body parts to which the plurality of body key points belong, and using the angle as the second action feature information;
obtaining a displacement amount between at least one of the plurality of body key points and a body key point corresponding to a reference video frame, and using the displacement amount as the second action feature information, the reference video frame being previous to the each video frame by a third preset quantity of video frames; and
obtaining a size of a reference body part in any two preset body parts and a distance between the any two preset body parts, and using a ratio of the distance to the size of the reference body part as the second action feature information.

10. The electronic device according to claim 6, wherein the first action feature information is a first action matrix comprising M first action vectors, the preset feature information is a preset action matrix comprising N preset action vectors, M and N being positive integers, and the obtaining a similarity between the first action feature information of the each target window and preset feature information comprises:
creating a similarity matrix, the similarity matrix having M rows and N columns, or N rows and M columns;
obtaining, for a specified position corresponding to an $i^{th}$ first action vector and a $j^{th}$ preset action vector in the similarity matrix, a sum of a maximum similarity among similarities of a first position, a second position, and a third position and a similarity between the $i^{th}$ first action vector and the $j^{th}$ preset action vector as a similarity of the specified position, the first position being a position corresponding to an $(i-1)^{th}$ first action vector and the $j^{th}$ preset action vector, the second position being a position corresponding to the $(i-1)^{th}$ first action vector and a $(j-1)^{th}$ preset action vector, and the third position being a position corresponding to the $i^{th}$ first action vector and the $(j-1)^{th}$ preset action vector, i being a positive integer not less than 1 and not greater than M, and j being a positive integer not less than 1 and not greater than N; and
determining a similarity of a position corresponding to an $M^{th}$ first action vector and an $N^{th}$ preset action vector in the similarity matrix as the similarity between the first action feature information and the preset feature information.

11. A non-transitory computer-readable storage medium storing instructions that, when executed by one or more processors of an electronic device, cause the one or more processors to perform operations comprising:
extracting a plurality of target windows from a target video, each of the plurality of target windows comprising a respective plurality of consecutive video frames;
for each of the plurality of target windows:
performing action recognition on the respective plurality of consecutive video frames corresponding to the target window to obtain respective first action feature information of the target window, the first action feature information comprising movement of one or more body parts of a subject and is used for describing a dynamic action comprised in the target window; and
obtaining a similarity between the first action feature information of the target window and preset feature information, the preset feature information being used for describing a preset dynamic action;
determining, from the respective obtained similarities corresponding to the plurality of target windows, a highest first similarity and a first target window corresponding to the highest first similarity; and
determining a dynamic action corresponding to the highest first similarity as the preset dynamic action when (i) the highest first similarity is greater than a first preset threshold and (ii) a difference between the highest first similarity and a second similarity is greater than a second preset threshold, the second similarity being a similarity between respective first action feature information of a target window adjacent to the first target window and the preset feature information.

12. The non-transitory computer-readable storage medium according to claim 11, wherein extracting the plurality of target windows from a target video further comprises:
classifying the plurality of video frames.

13. The non-transitory computer-readable storage medium according to claim 11, wherein performing the action recognition on the respective plurality of consecutive video frames further comprises:
extracting, for each of the video frames, a plurality of body key points in the video frame;
performing action recognition on the video frame according to a distribution of the plurality of body key points, to obtain second action feature information of the video frame, the second action feature information is used for describing a static action comprised in the video frame; and
combining a plurality of second action feature information of the video frames in the target window, to obtain the first action feature information of the target window.

14. The non-transitory computer-readable storage medium according to claim 13, wherein the preset dynamic action is performed using at least two preset body parts; and performing action recognition on the video frame according to the distribution comprises one or more of:
determining an angle between any two preset body parts in the video frame according to coordinates of the plurality of body key points in the video frame and body parts to which the plurality of body key points belong, and using the angle as the second action feature information;
obtaining a displacement amount between at least one of the plurality of body key points and a body key point corresponding to a reference video frame, and using the displacement amount as the second action feature information, the reference video frame being previous to the each video frame by a third preset quantity of video frames; and
obtaining a size of a reference body part in any two preset body parts and a distance between the any two preset body parts, and using a ratio of the distance to the size of the reference body part as the second action feature information.

15. The non-transitory computer-readable storage medium according to claim 11, wherein the first action feature information is a first action matrix comprising M first action vectors, the preset feature information is a preset action matrix comprising N preset action vectors, M and N being positive integers, and the obtaining a similarity between the first action feature information of the each target window and preset feature information comprises:
creating a similarity matrix, the similarity matrix having M rows and N columns, or N rows and M columns;
obtaining, for a specified position corresponding to an $i^{th}$ first action vector and a $j^{th}$ preset action vector in the similarity matrix, a sum of a maximum similarity among similarities of a first position, a second position, and a third position and a similarity between the $i^{th}$ first action vector and the $j^{th}$ preset action vector as a similarity of the specified position, the first position being a position corresponding to an $(i-1)^{th}$ first action vector and the $j^{th}$ preset action vector, the second position being a position corresponding to the $(i-1)^{th}$ first action vector and a $(j-1)^{th}$ preset action vector, and the third position being a position corresponding to the $i^{th}$ first action vector and the $(j-1)^{th}$ preset action vector, i being a positive integer not less than 1 and not greater than M, and j being a positive integer not less than 1 and not greater than N; and
determining a similarity of a position corresponding to an $M^{th}$ first action vector and an $N^{th}$ preset action vector in the similarity matrix as the similarity between the first action feature information and the preset feature information.

* * * * *